(12) United States Patent
Zhou et al.

(10) Patent No.: US 12,335,784 B2
(45) Date of Patent: Jun. 17, 2025

(54) BACKGROUND DATA TRANSFER POLICY FORMULATION METHOD, APPARATUS, AND SYSTEM

(71) Applicant: Huawei Technologies Co., Ltd., Shenzhen (CN)

(72) Inventors: Xiaoyun Zhou, Nanjing (CN); Yali Yan, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 372 days.

(21) Appl. No.: 18/060,202

(22) Filed: Nov. 30, 2022

(65) Prior Publication Data

US 2023/0098362 A1 Mar. 30, 2023

Related U.S. Application Data

(63) Continuation of application No. PCT/CN2021/098005, filed on Jun. 2, 2021.

(30) Foreign Application Priority Data

Jun. 3, 2020 (CN) .......................... 202010496925.5
Sep. 24, 2020 (CN) .......................... 202011017967.2

(51) Int. Cl.
*H04W 28/16* (2009.01)
(52) U.S. Cl.
CPC ................... *H04W 28/16* (2013.01)
(58) Field of Classification Search
CPC ...... H04W 28/16; H04W 4/24; H04L 47/826; H04L 47/803; H04L 12/1407;

(Continued)

(56) References Cited

U.S. PATENT DOCUMENTS

2019/0394279 A1 12/2019 Dao et al.
2021/0076261 A1* 3/2021 Xin ........................ H04W 28/10

(Continued)

OTHER PUBLICATIONS

"3rd Generation Partnership Project; Technical Specification Group Services and System Aspects; Policy and Charging Control Framework for the 5G System; Stage 2 (Release 16)", vol. SA WG2, (Jun. 11, 2019), 3GPP Draft; 23503-G10_CRS_Implemented, 3rd Generation Partnership Project (3GPP), Mobile Competence Centre ; 650, Route Des Lucioles ; F-06921 Sophia-Antipolis Cedex ; France, vol. SA WG2, Jun. 11, 2019 (Jun. 11, 2019), XP051756426, 99 pages.

(Continued)

*Primary Examiner* — Abdullahi Ahmed
(74) *Attorney, Agent, or Firm* — Slater Matsil, LLP

(57) ABSTRACT

Embodiments of this application disclose a background data transfer policy formulation method, an apparatus, and a system. The method includes: A first policy control network element sends, to a first network element, a first message used to request a background data transfer policy stored in the first network element, and obtains, from the first network element, the background data transfer policy stored in the first network element and second decision information that is used to formulate a second background data transfer policy. The first policy control network element formulates a first background data transfer policy based on first decision information used to formulate the first background data transfer policy and the second decision information and according to the background data transfer policy stored in the first network element.

20 Claims, 13 Drawing Sheets

(58) Field of Classification Search
CPC . H04L 47/828; H04M 15/66; H04M 15/8016; H04M 15/8083
See application file for complete search history.

(56) References Cited

U.S. PATENT DOCUMENTS

| | | | |
|---|---|---|---|
| 2021/0282053 A1* | 9/2021 | Xin | H04W 28/24 |
| 2023/0037031 A1* | 2/2023 | Wang | H04W 8/08 |
| 2023/0037402 A1* | 2/2023 | Xin | H04L 41/14 |
| 2024/0244399 A1* | 7/2024 | Sung | H04W 76/40 |
| 2024/0314718 A1* | 9/2024 | Chen | H04W 8/08 |

OTHER PUBLICATIONS

"3rd Generation Partnership Project; Technical Specification Group Services and System Aspects; Procedures for the 5G System (5GS); Stage 2 (Release 16)", vol. SA WG2, No. V16.4.0, (Mar. 27, 2020), pp. 1-582, 3GPP Standard; Technical Specification; 3GPP TS 23.502, 3rd Generation Partnership Project (3GPP), Mobile Competence Centre ; 650, Route Des Lucioles ; F-06921 Sophia-Antipolis Cedex ; France, vol. SA WG2, No. V16.4.0, Mar. 27, 2020 (Mar. 27, 2020), pp. 1-582, XP051861092.

3GPP TS 23.288 V16.3.0 (Mar. 2020), 3rd Generation Partnership Project; Technical Specification Group Services and System Aspects; Architecture enhancements for 5G System (5GS) to support network data analytics services Release 16), total 62 pages.

\* cited by examiner

BACKGROUND DATA TRANSFER POLICY FORMULATION METHOD, APPARATUS, AND SYSTEM

CROSS-REFERENCE TO RELATED APPLICATIONS

This application is a continuation of International Patent Application No. PCT/CN2021/098005, filed on Jun. 2, 2021, which claims priority to Chinese Patent Application No. 202010496925.5, filed on Jun. 3, 2020 and Chinese Patent Application No. 202011017967.2, filed on Sep. 24, 2020. All of the aforementioned patent applications are hereby incorporated by reference in their entireties.

TECHNICAL FIELD

Embodiments of this application relate to the field of communication technologies, and in particular, to a background data transfer policy formulation method, an apparatus, and a system.

BACKGROUND

In a 3rd generation partnership project (3GPP) communication system, a network side device provides functions for service access of a user, such as policy control, application detection and service awareness, charging control, usage control, and traffic steering, and provides functions for a third-party application, such as quality of service (QoS) assurance, data service sponsorship, and background data transfer policy negotiation.

In a process in which the network side device provides the background data transfer policy negotiation function for the third-party application, the network side device obtains all existing background data transfer policies, and determines candidate background data transfer policies according to all the obtained background data transfer policies and based on other information. A third-party application server selects one of the candidate background data transfer policies as a background data transfer policy of the third-party application server, to perform background data transfer. In this background data transfer policy negotiation manner, a background data transfer policy that is being formulated by another network side device for another third-party application server is not considered. Consequently, the formulated background data transfer policy may not be optimal, and normal transfer of background data is affected. In addition, when executing the background data transfer policy, the network side device does not consider that another network side device may be modifying the background data transfer policy. Consequently, the background data transfer policy is incorrectly executed.

SUMMARY

Embodiments of this application provide a background data transfer policy formulation method, an apparatus, and a system, to resolve a problem that a conflict occurs when a plurality of policy control network elements formulate background data transfer policies.

To achieve the foregoing objectives, the following technical solutions are used in embodiments of this application.

According to a first aspect, an embodiment of this application provides a background data transfer policy formulation method. The method may include: A first policy control network element sends, to a first network element, a first message used to request a background data transfer policy stored in the first network element, obtains, from the first network element, the background data transfer policy stored in the first network element and second decision information that is used to formulate a second background data transfer policy, and formulates a first background data transfer policy based on first decision information used to formulate the first background data transfer policy and the second decision information and according to the background data transfer policy stored in the first network element.

According to the first aspect, when formulating a background data transfer policy, a policy control network element refers to existing background data transfer policies and decision information corresponding to a background data transfer policy that is being formulated by another policy control network element, so as to avoid a conflict between the formulated background data transfer policy and the background data transfer policy being formulated by the another policy control network element, and ensure availability of the background data transfer policy.

In a possible design, the first decision information includes one or more of the following: a quantity of first terminals, a first time window, information about a first network area, first traffic generated when each terminal transfers background data, or a reason for formulating the first background data transfer policy; and the second decision information includes one or more of the following: a quantity of second terminals, a second time window, information about a second network area, second traffic generated when each terminal transfers background data, or a reason for formulating the second background data transfer policy. Based on the possible design, one or more of decision information may be provided for the policy control network element, to improve accuracy of formulating the background data transfer policy by the policy control network element based on the decision information.

In a possible design, the second decision information includes one or more of the following: a quantity of second terminals, a second time window, information about a second network area, second traffic generated when each terminal transfers background data, an indication that the second background data transfer policy is being negotiated, or a reason for formulating the second background data transfer policy. Based on the possible design, one or more of decision information may be provided for the policy control network element, to improve accuracy of formulating the background data transfer policy by the policy control network element based on the decision information.

In a possible design, that the first policy control network element formulates a first background data transfer policy based on first decision information and the second decision information and according to the background data transfer policy stored in the first network element includes: when determining that the second decision information affects formulation of the first background data transfer policy, the first policy control network element formulates the first background data transfer policy based on the first decision information and the second decision information and according to the background data transfer policy stored in the first network element, where execution of the first background data transfer policy and execution of the second background data transfer policy do not affect each other. Based on the possible design, when the second decision information affects formulation of the first background data transfer policy, the first policy control network element does not delay formulation of the first background data transfer policy, but continues to formulate the first background data transfer policy based on the first decision information and according to all obtained background data transfer policies, that is, concurrently formulates the first background data transfer policy and the second background data transfer policy, to improve a formulation speed of the background data transfer policies. In addition, to avoid a conflict between the first background data transfer policy and the second background data transfer policy, it is required that execution of the first background data transfer policy and execution of the second background data transfer policy not affect each other, so as to avoid network congestion and ensure normal transfer of background data.

In a possible design, that the first policy control network element formulates a first background data transfer policy based on first decision information and the second decision information and according to the background data transfer policy stored in the first network element includes: when determining that the second decision information affects formulation of the first background data transfer policy, after obtaining the second background data transfer policy, the first policy control network element formulates the first background data transfer policy based on the first decision information and according to the background data transfer policy stored in the first network element and the second background data transfer policy. Based on the possible design, when the second decision information affects formulation of the first background data transfer policy, the first policy control network element delays formulation of the first background data transfer policy, first completes formulation of the second background data transfer policy, and then formulates the first background data transfer policy according to all formulated background data transfer policies, so as to avoid a conflict between the first background data transfer policy and the second background data transfer policy and ensure normal transfer of background data.

In a possible design, that the first policy control network element formulates a first background data transfer policy based on first decision information and the second decision information and according to the background data transfer policy stored in the first network element includes: The first policy control network element delays formulation of the first background data transfer policy. After obtaining the second background data transfer policy, the first policy control network element formulates the first background data transfer policy based on the first decision information and according to the background data transfer policy stored in the first network element.

Based on the possible design, the first policy control network element delays formulation of the first background data transfer policy. After formulation of the second background data transfer policy is completed, the first policy control network element formulates the first background data transfer policy according to all formulated background data transfer policies (including the second background data transfer policy), so as to avoid a conflict between the first background data transfer policy and the second background data transfer policy, and ensure normal transfer of background data.

In a possible design, that the first policy control network element formulates a first background data transfer policy based on first decision information and the second decision information and according to the background data transfer policy stored in the first network element includes: The first policy control network element delays formulation of the first background data transfer policy. After obtaining a deletion indication corresponding to the second decision information, the first policy control network element formulates the first background data transfer policy based on the first decision information and according to the background data transfer policy stored in the first network element.

Based on the possible design, in a process in which the first policy control network element formulates the first background data transfer policy based on the second decision information, if receiving the deletion indication corresponding to the second decision information, the first policy control network element deletes the second decision information or a background data transfer policy corresponding to the second decision information, and no longer refer to the second decision information or the background data transfer policy corresponding to the second decision information, to formulate the first background data transfer policy. This improves accuracy of formulating the first background data transfer policy and deletes an unavailable/invalid background data transfer policy in a timely manner, thereby improving resource utilization.

In a possible design, that the second decision information affects formulation of the first background data transfer policy includes one or both of the following cases: the first time window overlaps the second time window, or the network area indicated by the information about the first network area overlaps the network area indicated by the information about the second network area. Based on the possible design, whether the second decision information affects formulation of the first background data transfer policy may be determined depending on whether transfer time windows corresponding to background data overlap and/or whether network areas to which background data transfer policies are applicable overlap, so as to avoid using a same time window and/or a same network area to formulate a plurality of background data transfer policies, and avoid transferring a large amount of background data by using the plurality of background data transfer policies, thereby ensuring normal transfer of the background data.

In a possible design, the first message includes a first reference identifier and the first decision information, and the first reference identifier identifies the first background data transfer policy. Based on the possible design, the first policy control network element may send the first decision information to the first network element, so that the first network element stores the first decision information, and sends the first decision information to another policy control network element when the first network element formulates the first background data transfer policy based on the first decision information, and when the another policy control network element formulates a background data transfer policy. Therefore, the another policy control network element formulates the background data transfer policy of the another policy control network element based on the first decision information, thereby avoiding a conflict between different background data transfer policies, where the conflict affects availability of the background data transfer policies, and causes network congestion.

In a possible design, before the first policy control network element sends the first message to the first network element, the method further includes: The first policy control network element receives, from a first application server, a second message that includes the first decision information, where the second message is used to request the first policy control network element to formulate the first background data transfer policy. Based on the possible design, the first policy control network element obtains the first decision information from the first application server. To be specific, the application server sends a background data transfer requirement and the like of a user to the policy control network element, and the user does not need to send the background data transfer requirement and the like to the policy control network element via a plurality of network elements, thereby reducing signaling overheads.

In a possible design, the method further includes: The first policy control network element sends the first message to the first network element when a network performance indicator is lower than or restored to a preset threshold, where a network performance indicator event is an event in which a network performance indicator in a time window of a third background data transfer policy is lower than or restored to the preset threshold, and the third background data transfer policy is a background data transfer policy formulated based on the first decision information. Based on the possible design, when a network performance indicator used when a background data transfer policy is used to transfer background data is lower than or restored to the preset threshold, that is, when a network status changes, the first policy control network element may send the first message to the first network element in a timely manner to obtain the formulated background data transfer policy, and may adaptively adjust a currently used background data transfer policy according to the formulated background data transfer policy, so that the currently used background data transfer policy meets a network transfer requirement, thereby improving use of the background data transfer policy.

In a possible design, the method further includes: The first policy control network element sends, to a network data analytics function (NWDAF), a subscription request used to obtain the network performance indicator event, and receives the network performance indicator event notified by the NWDAF. Based on the possible design, the first policy control network element may learn, via the NWDAF, that the network performance indicator is lower than or restored to the preset threshold. To be specific, the NWDAF analyzes whether the network performance indicator is lower than or restored to the preset threshold, and notifies the first policy control network element, to reduce power consumption for the first policy control network element to determine whether the network performance indicator is lower than or restored to the preset threshold.

In a possible design, the first network element includes a unified data management (UDM) network element, a network repository function (NRF) network element, or a unified data repository (UDR) network element. Based on the possible design, a plurality of different network elements such as the UDM network element, the NRF network element, or the UDR network element may store information such as a background data transfer policy, thereby improving system design flexibility.

In a possible design, the method further includes: The first policy control network element sends a third message including the first reference identifier and the first decision information to the first network element, where the first reference identifier identifies the first background data transfer policy.

Based on the possible design, the first policy control network element may include the first reference identifier and the first decision information in the third message, and may send the third message to the first network element, so that the first network element stores the first decision information, and sends the first decision information to another policy control network element when the first network element formulates the first background data transfer policy based on the first decision information, and when the another policy control network element formulates a background data transfer policy. Therefore, the another policy control network element formulates the background data transfer policy of the another policy control network element based on the first decision information, thereby avoiding a conflict between different background data transfer policies, where the conflict affects availability of the background data transfer policies, and causes network congestion.

According to a second aspect, an embodiment of this application further provides a background data transfer policy formulation method. The method includes: A first network element receives second decision information from a second policy control network element, where the second decision information corresponds to a second background data transfer policy. The first network element receives a first message from a first policy control network element, where the first message is used to request a background data transfer policy stored in the first network element. The first network element sends the background data transfer policy stored in the first network element and the second decision information to the first policy control network element, where the second decision information and the background data transfer policy stored in the first network element are used to formulate a first background data transfer policy.

According to the second aspect, the first network element sends the stored background data transfer policy and the decision information corresponding to the background data transfer policy that is being negotiated to the first policy control network element that is to formulate the background data transfer policy, so that when formulating the background data transfer policy, the first policy control network element refers to the existing background data transfer policy and the decision information corresponding to the background data transfer policy that is being formulated by another policy control network element, thereby avoiding a conflict between the formulated background data transfer policy and the background data transfer policy that is being formulated by the another policy control network element, to ensure availability of the background data transfer policy.

In a possible design, the method further includes: The first network element receives the second background data transfer policy from the second policy control network element. The first network element sends the second background data transfer policy to the first policy control network element, where the second background data transfer policy is used to formulate the first background data transfer policy.

Based on the possible design, the successfully negotiated background data transfer policy may be sent to the first policy control network element, so that the first policy control network element formulates the background data transfer policy of the first policy control network element according to the successfully negotiated background data transfer policy, thereby avoiding a conflict between different background data transfer policies.

In a possible design, the method further includes: The first network element receives, from the second policy control network element, a deletion indication for deleting the second decision information. The first network element deletes the second decision information based on the deletion indication. The first network element sends, to the first policy control network element, the deletion indication corresponding to the second decision information, where the deletion indication indicates the first policy control network element to delete the second decision information.

Based on the possible design, when the second decision information or the background data transfer policy corresponding to the second decision information is invalid/unavailable, the second decision information or the background data transfer policy corresponding to the second decision information may be deleted, so that the first policy control network element deletes, based on the deletion indication sent by the first network element, the obtained second decision information and/or the obtained background data transfer policy corresponding to the second decision information, and no longer uses, when formulating the background data transfer policy of the first policy control network element, the second decision information and/or the background data transfer policy corresponding to the second decision information, thereby improving accuracy of formulation of the background data transfer policy and improving resource utilization.

For related descriptions of the second decision information in the second aspect or the possible designs of the second aspect, refer to the descriptions in the first aspect or the possible designs of the first aspect. Details are not described again.

According to a third aspect, an embodiment of this application further provides a session management method. The method includes: A second policy control network element receives a policy association establishment request corresponding to an establishment request for a session of user equipment UE, sends, to a first network element, a fourth message that is used to request a first background data transfer policy applied to the session, obtains, from the first network element, first decision information that corresponds to the first background data transfer policy, and manages the session based on the first decision information.

Based on the method in the third aspect, when formulating a session management policy of the session of the UE, the policy control network element may obtain, from the first network element, the decision information required for formulating the session management policy of the UE, and manage the session based on the obtained decision information, so as to avoid a conflict between the formulated background data transfer policy corresponding to the decision information and the session of the UE, and ensure availability of the background data transfer policy and the session of the UE.

In a possible design, that a second policy control network element manages the session based on the first decision information includes: The second policy control network element rejects the policy association establishment request based on the first decision information.

Based on the possible design, when the first decision information affects formulation of a first policy, the second policy control network element rejects the policy association establishment request, and stops formulation of the session management policy of the session and establishment of a PDU session, so as to avoid a conflict between the session management policy of the session and the background data transfer policy corresponding to the first decision information, to ensure normal transfer of background data.

In a possible design, that a second policy control network element manages the session based on the first decision information includes: The second policy control network element accepts the policy association establishment request based on the first decision information.

Based on the possible design, the second policy control network element accepts the policy association establishment request, and formulates the session management policy of the session according to the background data transfer policy corresponding to the first decision information, to ensure normal transfer of the background data.

In a possible design, the method further includes: After receiving the first background data transfer policy that corresponds to the first decision information and that is sent by the first network element, the second policy control network element formulates, according to the first background data transfer policy, a session management policy that is of the session and that is used to perform policy and charging control on the session, and sends the session management policy of the session to a session management network element.

Based on the possible design, the second policy control network element delays formulation of the first policy. After formulation of the first background data transfer policy is completed, the second policy control network element formulates the session management policy according to all formulated background data transfer policies (including the first background data transfer policy) and establishes the session, so as to avoid a conflict between the first background data transfer policy and the session management policy, and ensure normal transfer of the background data.

In a possible design, the method further includes: The second policy control network element terminates a policy association according to the first background data transfer policy after receiving the first background data transfer policy sent by the first network element.

Based on the possible design, after the second policy control network element formulates the first background data transfer policy, if the first background data transfer policy conflicts with the session management policy, the second policy control network element terminates the policy association according to the first background data transfer policy, so as to avoid a conflict between the first background data transfer policy and the session management policy, to ensure normal transfer of the background data.

In a possible design, the method further includes: The second policy control network element terminates the policy association after receiving a deletion indication corresponding to the first decision information.

Based on the possible design, the second policy control network element receives the deletion indication corresponding to the first decision information, and determines that the first background data transfer policy is unavailable/invalid, in other words, the first background data transfer policy associated with the session management policy does not exist. In this case, the second policy control network element terminates the policy association, thereby avoiding a background data transfer failure caused by an invalid established session of the terminal.

For related descriptions of the first decision information in the third aspect or the possible designs of the third aspect, refer to the descriptions in the first aspect or the possible designs of the first aspect. Details are not described again.

In a possible design, the fourth message includes a first reference identifier. For related descriptions of the first reference identifier, refer to the descriptions in the first aspect or the possible designs of the first aspect. Details are not described again.

According to a fourth aspect, an embodiment of this application further provides a UE policy management method. The method includes: A second policy control network element receives a policy association establishment request corresponding to a registration request of user equipment, sends a fourth message to a first network element, where the fourth message is used to request a first background data transfer policy applied to the UE, obtains first decision information from the first network element, where the first decision information corresponds to the first background data transfer policy, and formulates a UE policy of the UE based on the first decision information.

Based on the method in the fourth aspect, when formulating the UE policy of the UE, the policy control network element may obtain, from the first network element, the decision information required for formulating the UE policy of the UE, and manage a session based on the obtained decision information, so as to avoid a conflict between the formulated background data transfer policy corresponding to the decision information and the UE policy, and ensure availability of the background data transfer policy and the UE policy of the UE.

In a possible design, that a second policy control network element formulates a UE policy of the UE based on the first decision information includes: The second policy control network element delays formulation of the UE policy of the UE, and formulates the UE policy of the UE according to the first background data transfer policy after obtaining the first background data transfer policy corresponding to the first decision information.

Based on the possible design, when the first decision information affects formulation of the UE policy of the UE, the second policy control network element delays formulation of the UE policy of the UE. After obtaining the first background data transfer policy corresponding to the first decision information, the second policy control network element formulates the UE policy according to the background data transfer policy corresponding to the first decision information, to ensure normal transfer of background data.

In a possible design, the method further includes: The second policy control network element sends a policy association establishment response, where the policy association establishment response does not carry the UE policy of the UE.

For related descriptions of the first decision information in the fourth aspect or the possible designs of the fourth aspect, refer to the descriptions in the first aspect or the possible designs of the first aspect. Details are not described again.

In a possible design, the fourth message includes a first reference identifier. For related descriptions of the first reference identifier, refer to the descriptions in the first aspect or the possible designs of the first aspect. Details are not described again.

According to a fifth aspect, this application provides a communication apparatus. The communication apparatus may be a first policy control network element or a chip or a system-on-a-chip in the first policy control network element, or may be a module or a unit that is in the first policy control network element and that is configured to implement the background data transfer policy formulation method in embodiments of this application, or may be another module or unit that can implement the method performed by the first policy control network element. The communication apparatus may implement functions performed by the first policy control network element in the first aspect or the possible designs. In a design, the communication apparatus may include modules, units, or means that are in a one-to-one correspondence with the method/operations/steps/actions described in the first aspect. The modules, units, or means may be implemented by hardware, software, or hardware executing corresponding software. The hardware or the software includes one or more modules or units corresponding to the foregoing functions. For example, the communication apparatus may include a sending unit, a receiving unit, and a processing unit.

The sending unit is configured to send a first message to a first network element, where the first message is used to request a background data transfer policy stored in the first network element.

The receiving unit is configured to obtain, from the first network element, the background data transfer policy stored in the first network element and second decision information, where the second decision information is used to formulate a second background data transfer policy.

The processing unit is configured to formulate a first background data transfer policy based on first decision information and the second decision information and according to the background data transfer policy stored in the first network element, where the first decision information is information used to formulate the first background data transfer policy.

For related definitions of the first decision information and the second decision information and a manner of formulating the first background data transfer policy by the processing unit, refer to the descriptions in the first aspect or the possible designs of the first aspect. Details are not described again.

For a specific implementation of the communication apparatus, refer to behavior functions of the terminal in the data transfer method provided in any one of the first aspect or the possible designs of the first aspect. Details are not described herein again. Therefore, the provided communication apparatus can achieve same beneficial effects as any one of the first aspect or the possible designs of the first aspect.

In a possible design, the communication apparatus in the fifth aspect may be a first network element or a chip or a system-on-a-chip in the first network element, or may be a module or a unit that is in the first network element and that is configured to implement the background data transfer policy formulation method in embodiments of this application, or may be another module or unit that can implement the method performed by the first network element. The communication apparatus may implement functions performed by the first network element in the second aspect or the possible designs of the second aspect. For example, the communication apparatus may include modules, units, or means that are in a one-to-one correspondence with the method/operations/steps/actions described in the second aspect. The modules, units, or means may be implemented by hardware, software, or hardware executing corresponding software. The hardware or the software includes one or more modules or units corresponding to the foregoing functions.

For example, the communication apparatus may be configured to: receive the second decision information from a second policy control network element, where the second decision information corresponds to the second background data transfer policy; receive the first message from the first policy control network element, where the first message is used to request the background data transfer policy stored in the first network element; and send the background data transfer policy stored in the first network element and the second decision information to the first policy control network element, where the second decision information and the background data transfer policy stored in the first network element are used to formulate the first background data transfer policy.

In another possible design, the communication apparatus in the fifth aspect may be the second policy control network element or a chip or a system-on-a-chip in the second policy control network element, or may be a module or a unit that is in the second policy control network element and that is configured to implement the session management method in embodiments of this application, or may be another module or unit that can implement the method performed by the second policy control network element. The communication apparatus may implement functions performed by the second policy control network element in the third aspect or the possible designs of the third aspect. In a design, the communication apparatus may include modules, units, or means that are in a one-to-one correspondence with the method/operations/steps/actions described in the third aspect. The modules, units, or means may be implemented by hardware, software, or hardware executing corresponding software. The hardware or the software includes one or more modules or units corresponding to the foregoing functions.

For example, the communication apparatus is configured to: receive a policy association establishment request corresponding to an establishment request for a session of user equipment UE, send, to a first network element, a fourth message that is used to request a first background data transfer policy applied to the session, obtain, from the first network element, first decision information that corresponds to the first background data transfer policy, and manage the session based on the first decision information.

For another example, the communication apparatus is configured to: receive a policy association establishment request corresponding to a registration request of user equipment, send, to a first network element, a fourth message that is used to request a first background data transfer policy applied to the UE, obtain first decision information from the first network element, where the first decision information corresponds to the first background data transfer policy, and formulate a UE policy of the UE based on the first decision information.

According to a sixth aspect, a communication apparatus is provided. The communication apparatus may be a first policy control network element or a chip or a system-on-a-chip in the first policy control network element, or another module or unit that can implement a method on a side of the first policy control network element. The communication apparatus may implement functions performed by the first policy control network element in the first aspect or the possible designs, and the functions may be implemented by hardware. In a possible design, the communication apparatus may include: a processor and a communication interface. The processor is configured to: send, to a first network element through the communication interface, a first message used to request a background data transfer policy stored in the first network element; obtain, from the first network element, the background data transfer policy stored in the first network element and second decision information that is used to formulate a second background data transfer policy; and formulate a first background data transfer policy based on first decision information used to formulate the first background data transfer policy and the second decision information and according to the background data transfer policy stored in the first network element.

In another possible design, the communication apparatus in the sixth aspect may be a first network element or a chip or a system-on-a-chip in the first network element, or may be a module or a unit that is in the first network element and that is configured to implement the background data transfer policy formulation method in embodiments of this application, or may be another module or unit that can implement the method performed by the first network element. For example, the communication apparatus may include a processor and a communication interface. The processor and the communication interface that are included in the communication apparatus are configured to support the communication apparatus in implementing the functions performed by the first network element in the second aspect or the possible designs of the second aspect.

In still another possible design, the communication apparatus in the sixth aspect may be a second policy control network element or a chip or a system-on-a-chip in the second policy control network element, or may be a module or a unit that is in the second policy control network element and that is configured to implement the session management method in embodiments of this application, or may be another module or unit that can implement the method performed by the second policy control network element. For example, the communication apparatus may include a processor and a communication interface. The processor and the communication interface included in the communication apparatus are configured to support the communication apparatus in implementing functions performed by the second policy control network element in the third aspect or the possible designs of the third aspect, or implementing functions performed by the second policy control network element in the fourth aspect or the possible designs of the fourth aspect.

In still another possible design, in the sixth aspect, the communication apparatus may further include a memory, and the memory is configured to store computer instructions and/or data. When the communication apparatus runs, the processor executes the computer instructions stored in the memory, so that the communication apparatus performs the background data transfer policy formulation method according to any one of the first aspect or the possible designs of the first aspect, performs the background data transfer policy formulation method according to any one of the second aspect or the possible designs of the second aspect, performs the session management method according to any one of the third aspect or the possible designs of the third aspect, or performs the UE policy management method according to any one of the fourth aspect or the possible designs of the fourth aspect. In embodiments of this application, the communication interface may be a transceiver, an interface circuit, a bus interface, a pin, or another apparatus that can implement a transceiver function.

According to a seventh aspect, a computer-readable storage medium is provided. The computer-readable storage medium stores instructions. When the instructions are run on a computer, the computer is enabled to perform the background data transfer policy formulation method according to any one of the first aspect or the possible designs of the first aspect, perform the background data transfer policy formulation method according to any one of the second aspect or the possible designs of the second aspect, perform the session management method according to any one of the third aspect or the possible designs of the third aspect, or perform the UE policy management method according to any one of the fourth aspect or the possible designs of the fourth aspect.

According to an eighth aspect, a computer program product including instructions is provided. The computer program product may include program instructions. When the computer program product runs on a computer, the computer is enabled to perform the background data transfer policy formulation method according to any one of the first aspect or the possible designs of the first aspect, perform the background data transfer policy formulation method according to any one of the second aspect or the possible designs of the second aspect, perform the session management method according to any one of the third aspect or the possible designs of the third aspect, or perform the UE policy management method according to any one of the fourth aspect or the possible designs of the fourth aspect.

According to a ninth aspect, a chip system is provided. The chip system includes a processor and a communication interface. The chip system may be configured to implement functions performed by the first policy control network element in any one of the first aspect or the possible designs of the first aspect. For example, the processor is configured to: send, to a first network element through the communication interface, a first message used to request a background data transfer policy stored in the first network element; obtain, from the first network element, the background data transfer policy stored in the first network element and second decision information that is used to formulate a second background data transfer policy; and formulate a first background data transfer policy based on first decision information used to formulate the first background data transfer policy and the second decision information and according to the background data transfer policy stored in the first network element.

In still another possible design, the chip system may implement functions performed by the first network element in the second aspect or the possible designs of the second aspect, implement functions performed by the second policy control network element in the third aspect or the possible designs of the third aspect, or implement functions performed by the second policy control network element in the fourth aspect or the possible designs of the fourth aspect.

In a possible design, the chip system further includes a memory. The memory is configured to store program instructions and/or data. When the chip system runs, the processor executes the program instructions stored in the memory, so that the chip system performs the background data transfer policy formulation method according to any one of the first aspect or the possible designs of the first aspect. The chip system may include a chip, or may include a chip and another discrete component. This is not limited herein.

According to a tenth aspect, an embodiment of this application further provides a communication system. The communication system includes the communication apparatus and the first network element according to the fifth aspect or the sixth aspect.

DETAILED DESCRIPTION OF ILLUSTRATIVE EMBODIMENTS

Figure 1:
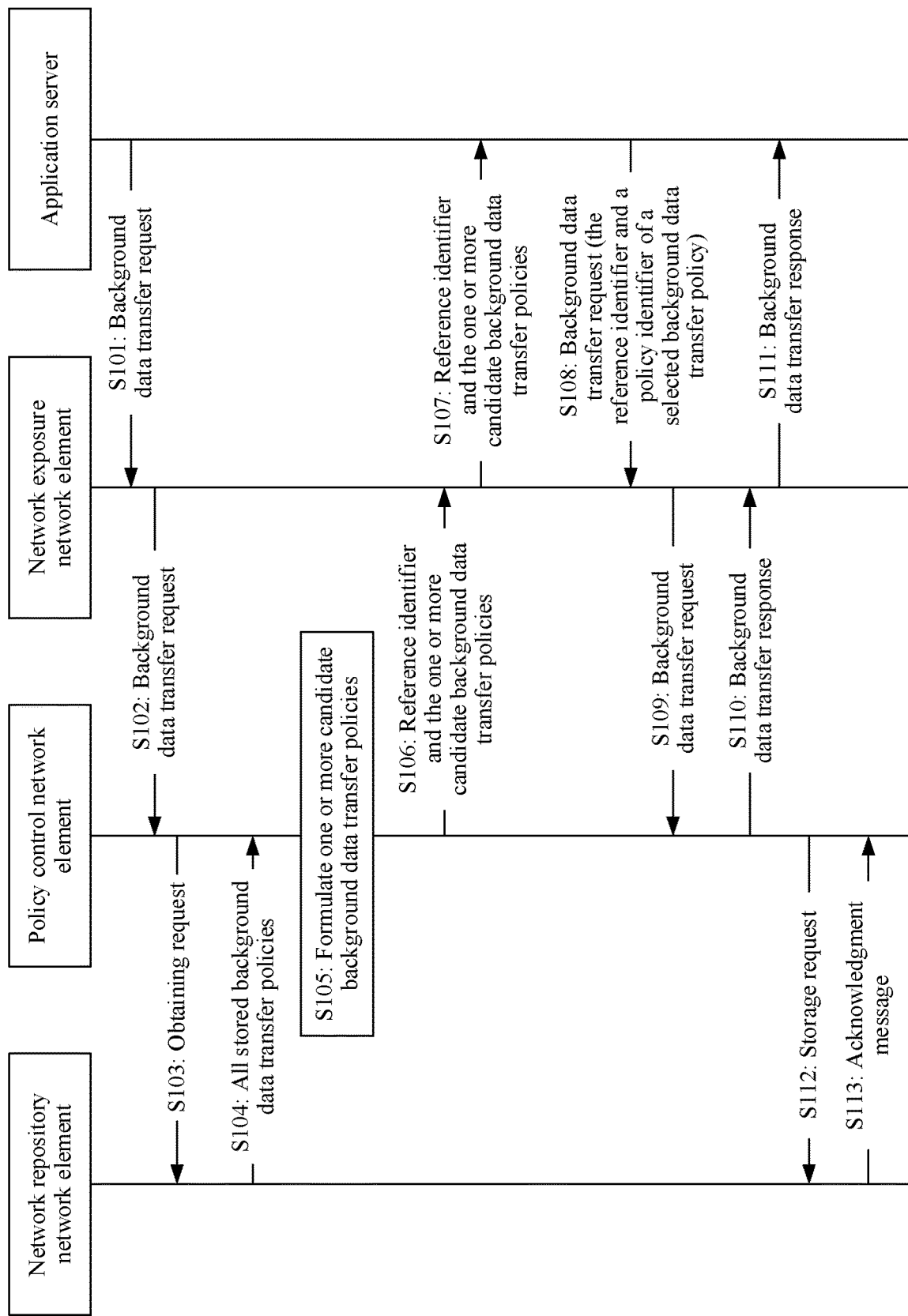
FIG. 1 is a flowchart of a background data transfer policy formulation method in a conventional technology.

Before embodiments of this application are described, technical terms used in embodiments of this application are described.

Background data is a type of non-real-time transferred data, and this type of data is usually executed at a background end of a mobile apparatus. For example, sometimes a user needs to upload or download a large amount of data to his/her mobile apparatuses: a smartphone and a tablet computer, for example, upload a batch of photos to his/her blog or download a movie from his/her friend's blog. Because data transfer of the uploading or downloading photos or a movie described above needs to take time and use system resources for processing, the data transfer is usually performed at the background end of the mobile apparatus, and the uploaded or downloaded photos or movie may be referred to as the background data.

Background data transfer (BDT) is a transfer mode proposed by 3GPP for communication between an application and a large quantity of terminal devices in the internet of things. A network off-peak time window is set to provide communication between the application and the terminal devices at a lower charge rate and a higher speed, and reduce transfer pressure of a network in peak hours. BDT is a core mode of AESE data transfer, and is very popular in a current 3GPP research. Background data transfer indicates that each node (such as a terminal, a server, or an application server) in a 3GPP system requests data transfer from an AESE. The AESE controls each data transfer request and determines specific time and a specific rate for responding to each data transfer request, so that load balancing is ensured.

A background data transfer policy is a policy used to transfer background data. The background data transfer policy is defined by a policy control network element. The background data transfer policy corresponds to the background data. The background data transfer policy is uniquely identified by a policy identifier/reference identifier. The background data transfer policy may include one or more of the following: a time window, a charge rate in the time window, a maximum aggregate bit rate, a rating group identifier, and a reference identifier (ID) corresponding to the background data transfer policy. The background data transfer policy provides a transfer basis for the background data, ensures a transfer requirement of the background data, and the like. The background data transfer policy is bound to decision information. The policy control network element can formulate the background data transfer policy based on the decision information and other information, such as all existing background data transfer policies, other network information (such as an access type of a terminal), and a carrier policy.

The decision information may include one or more of information such as a quantity of terminals, a time window, network area information, traffic generated when each terminal transfers the background data, or a reason for formulating the background data transfer policy. The quantity of terminals may be an estimated quantity of terminals that transfer the background data by using the background data transfer policy. The time window may be a time period specified by a user of the terminal or preset by a system for transferring the background data. The traffic generated when the terminal transfers the background data may be a maximum transfer rate required when the terminal transfers the background data. The network area information may indicate an application scope of the background data transfer policy, and the network area information may be physical area information or a geographical location, for example, a geographical location in a 3GPP network. If the decision information does not carry the network area information, it indicates that a scope in which the background data transfer policy corresponding to the decision information can be applied is an entire public land mobile network (PLMN).

The network information may refer to a current network status, and may indicate an access network used by the terminal for access, a type of a used radio access technology, a maximum transfer rate of a current network, and the like.

The carrier policy may be a policy pre-formulated by a carrier for a user (for example, a user who transfers the background data by using the background data transfer policy). The carrier policy may include one or more of the following: a usage level of the user, a QoS requirement of the user, a bandwidth authorized by the user, and the like.

FIG. 1 is a schematic diagram of formulation of a background data transfer policy in 3GPP. In the formulation of the background data transfer policy, a policy control network element needs to negotiate with an application server. Therefore, in this embodiment of this application, formulating the background data transfer policy is negotiating the background data transfer policy, and this is the same in the following embodiments. As shown in FIG. 1, a method may include the following steps: S101: An application server sends a background data transfer request to a network exposure network element, where the background data transfer request may carry an identifier (ID) of the application server and decision information used to formulate a background data transfer policy, and the background data transfer request is used to request to formulate the background data transfer policy. Correspondingly, the network exposure network element receives the background data transfer request. S102: The network exposure network element checks and authorizes the background data transfer request, and sends the background data transfer request to a policy control network element after the check and authorization succeed. Correspondingly, the policy control network element receives the background data transfer request. S103: The policy control network element sends an obtaining request to a network repository network element based on the background data transfer request, where the obtaining request may be used to request to obtain all existing background data transfer policies. Correspondingly, the network repository network element receives the obtaining request. S104: The network repository network element returns all the existing/stored background data transfer policies to the policy control network element. Correspondingly, the policy control network element receives all the background data transfer policies stored by the network repository network element. S105: The policy control network element formulates one or more candidate background data transfer policies according to all the existing background data transfer policies and a carrier policy and based on the decision information provided by the application server, other network information (such as an access type of a terminal), and the like. S106: The policy control network element returns a background data transfer response to the network exposure network element, where the background data transfer response carries a reference identifier (ID) allocated by the policy control network element to the background data transfer policy and the one or more candidate background data transfer policies. S107: The network exposure network element receives and returns the background data transfer response to the application server. S108: The application server receives the response message, selects one of the one or more candidate background data transfer policies, and sends a background data transfer request to the network exposure network element again, where the background data transfer request carries the reference identifier and a policy identifier of the selected background data transfer policy. S109: The network exposure network element receives the background data transfer request, and sends the background data transfer request to the policy control network element. S110: The policy control network element returns a background data transfer response to the network exposure network element. Sill: The network exposure network element returns the background data transfer response to the application server. S112: The policy control network element sends a storage request for storing the new background data transfer policy to the network repository network element, where the storage request carries the reference identifier and the selected background data transfer policy. S113: The network repository network element receives and correspondingly stores the new background data transfer policy and the reference identifier of the new background data transfer policy, and returns an acknowledgment message to the policy control network element.

It should be noted that an execution sequence of S110 to S113 in FIG. 1 is not limited. S110 and S111 may be performed before S112, as shown in FIG. 1, or S112 and S113 may be performed before S110 and S111. This is not limited.

Further, the application server or the terminal may transfer background data according to the background data transfer policy. Subsequently, when the background data is transferred according to the background data transfer policy, if a network performance indicator is low or the background data transfer policy needs to be adjusted based on an application requirement of the user, a new background data transfer policy may be renegotiated/formulated in the process shown in S103 to S113 in FIG. 1.

In the procedure shown in FIG. 1, the policy control network element needs to comprehensively consider all the existing background data transfer policies to determine the new background data transfer policy. Because a plurality of policy control network elements exist in a network, the plurality of policy control network elements may formulate background data transfer policies for a plurality of application servers at the same time. In this case, when formulating a background data transfer policy, each policy control network element does not consider a transfer policy that is being formulated by another policy control network element. Consequently, the formulated transfer policy may not be optimal, and a conflict of formulated background data transfer policies occurs. In addition, when executing the background data transfer policy, a network side device does not consider whether the background data transfer policy is updated, where for example, the background data transfer policy is modified by another network side device. Consequently, the background data transfer policy fails to be executed.

To resolve the foregoing technical problem, an embodiment of this application provides a background data transfer policy formulation method. When a policy control network element determines to formulate/adjust a background data transfer policy, and when the policy control network element sends a request for all existing transfer policies from a network repository network element, the policy control network element includes, in the request, decision information used to formulate/adjust the background data transfer policy, and the network repository network element stores the decision information used to formulate/adjust the background data transfer policy. Subsequently, when another policy control network element sends an obtaining request for obtaining the existing background data transfer policies to the network repository network element, the network repository network element provides, for the another policy control network element, all the existing background data transfer policies and the stored decision information used to formulate/adjust the background data transfer policy. Therefore, the another policy control network element formulates a background data transfer policy according to all the existing background data transfer policies and based on the stored decision information used to formulate/adjust the background data transfer policy. Alternatively, the another policy control network element delays formulation until the another policy control network element receives information for indicating that the background data transfer policy to be formulated or adjusted is finally formulated, and then formulates a background data transfer policy of the another policy control network element.

It should be noted that the background data and the background data transfer policy described in embodiments of this application are intended to describe the technical solutions in embodiments of this application more clearly, but do not constitute a limitation on the technical solutions provided in embodiments of this application. A person of ordinary skill in the art may learn that, with evolution of a network architecture and emergence of new service scenarios, the technical solutions provided in embodiments of this application are also applicable to a conflict caused when a transfer policy corresponding to another type of data is formulated.

The following describes a background data transfer policy formulation method provided in an embodiment of this application with reference to the accompanying drawings in this specification.

Figure 2A:
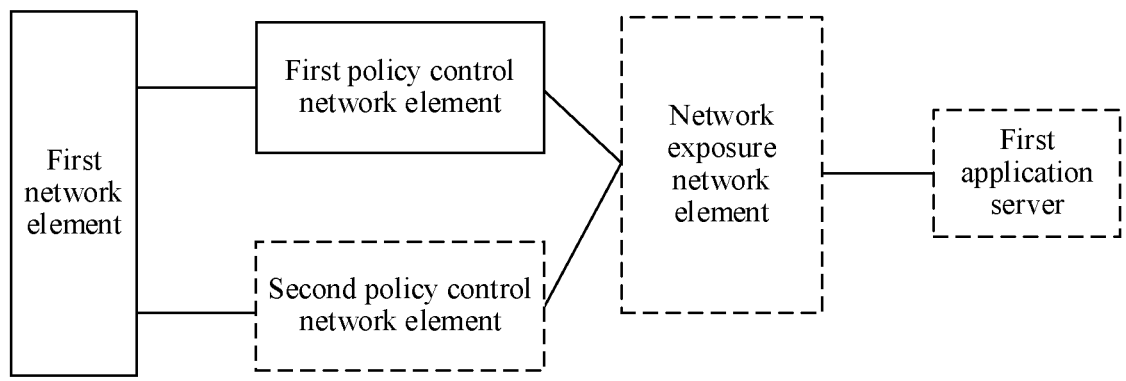
FIG. 2*a* is a schematic diagram of an architecture of a communication system according to an embodiment of this application.

The background data transfer policy formulation method provided in this embodiment of this application may be applied to a network shown in FIG. 2a. FIG. 2a shows a communication system 10 according to an embodiment of this application. The communication system 10 includes a first policy control network element and a first network element.

The first policy control network element may be configured to formulate a policy and charging control (PCC) rule) such as a background data transfer policy, a quality of service policy, and a slice selection policy, and provide the formulated policy for network elements such as a mobility management network element and a session management network element.

The first network element may be referred to as a network repository network element, and is configured to store user data, for example, subscription information, authentication data, or authorization data of a user. Specifically, the network repository network element may be a UDM network element, an NRF network element, a UDR network element, or the like.

Specifically, the first policy control network element is configured to send a first message to the first network element, where the first message is used to request a background data transfer policy stored in the first network element. The first network element is configured to receive the first message, and return all stored background data transfer policies to the first policy control network element.

The first policy control network element is further configured to: obtain, from the first network element, the background data transfer policy stored in the first network element and second decision information that is used to formulate a second background data transfer policy, and formulate a first background data transfer policy based on first decision information used to formulate the first background data transfer policy and the second decision information and according to the background data transfer policy stored in the first network element.

In a possible implementation, the first policy control network element is configured to: when determining that the second decision information affects formulation of the first background data transfer policy, formulate the first background data transfer policy based on the first decision information and the second decision information and according to the background data transfer policy stored in the first network element, where execution of the first background data transfer policy and execution of the second background data transfer policy do not affect each other. Alternatively, when determining that the second decision information affects formulation of the first background data transfer policy, after obtaining the second background data transfer policy, the first policy control network element formulates the first background data transfer policy based on the first decision information and according to the background data transfer policy stored in the first network element and the second background data transfer policy.

In this embodiment of this application, that the second decision information affects formulation of the first background data transfer policy may include one or both of the following cases: a first time window overlaps a second time window, or the network area indicated by information about a first network area overlaps the network area indicated by information about a second network area.

The first time window and the second time window may be a time period specified by a user of a terminal or preset by a system for transferring background data. That a first time window and a second time window overlap may mean: The first time window and the second time window partially or completely overlap. For example, the first time window may be a time period from 6:00 a.m. to 9:00 a.m., and the second time window may be a time period from 6:00 a.m. to 9:00 a.m. or a time period from 5:30 a.m. to 8:30 a.m.

The information about a first network area may indicate a range in which the first background data transfer policy can be applied, and the information about a second network area may indicate a range in which the second background data transfer policy can be applied. That the network area indicated by information about a first network area overlaps the network area indicated by information about a second network area may mean: The network area indicated by the information about the first network area partially or completely overlaps the network area indicated by the information about the second network area. For example, the first network area may be a cell 1, and the second network area may be a cell 1 or a partial area in the cell 1.

Further, as shown in FIG. 2*a*, the communication system may further include a second policy control network element and a first application server. It should be noted that the second policy control network element may be the same as or different from the first policy control network element. When the second policy control network element is the same as the first policy control network element, there may be one policy control network element in the communication system shown in FIG. 2*a*.

The first application server may be deployed in a carrier network that provides a data transfer service for the user or a network deployed by a third-party provider, for example, may be deployed in a carrier network that provides an internet protocol (IP) multi-media service (IMS) for the user. The first application server may be an application service (AS) or an application function (AF), and the first application server may provide a background data transfer service for the user.

Specifically, the first application server is configured to send a second message to the first policy control network element, where the second message includes the first decision information. The first policy control network element may be configured to: receive the second message, and send the first decision information to the first network element based on the second message. The first network element is further configured to receive and store the first decision information.

A function of the second policy control network element is similar to a function of the first policy control network element. The second policy control network element is a network element that formulates the second background data transfer policy based on the second decision information. For example, the second policy control network element is configured to: obtain, from the first network element, the background data transfer policy stored in the first network element, and formulate the second background data transfer policy based on the second decision information that is used to formulate the second background data transfer policy and according to the background data transfer policy stored in the first network element.

Further, the second policy control network element is further configured to send the second decision information to the first network element. The first network element is further configured to receive and store the second decision information.

It should be noted that, in this application, the first policy control network element and the second policy control network element may obtain the first decision information and the second decision information from a same application server. For example, the first policy control network element and the second policy control network element may obtain the first decision information and the second decision information from the first application server shown in FIG. 2*a*. Alternatively, the first policy control network element and the second policy control network element may obtain the first decision information and the second decision information from different application servers.

Figure 2B:
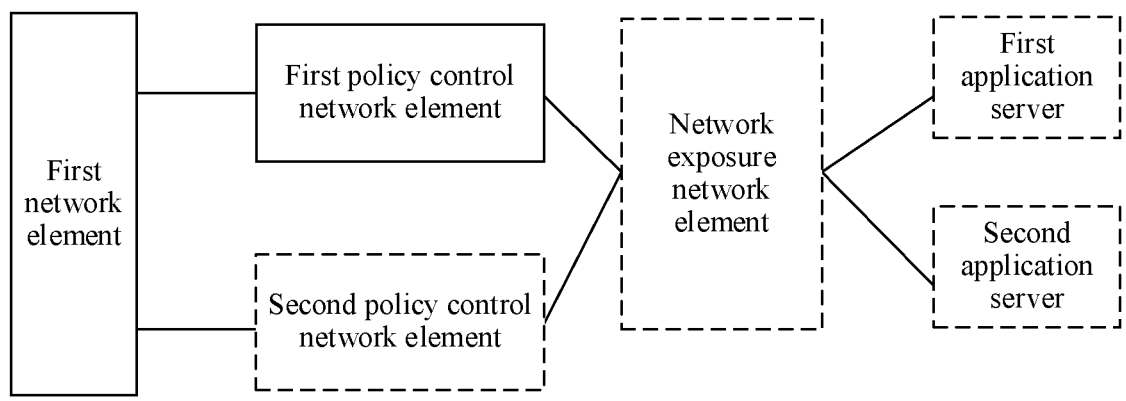
FIG. 2*b* is a schematic diagram of an architecture of another communication system according to an embodiment of this application.

When the first policy control network element and the second policy control network element obtain the first decision information and the second decision information from different application servers, as shown in FIG. 2*b*, the communication system shown in FIG. 2*a* may further include a second application server.

The second application server is configured to send the second decision information to the second policy control network element.

The second policy control network element is configured to obtain the second decision information from the second application server.

Further, the communication system shown in FIG. 2*a* or FIG. 2*b* may further include a network exposure network element.

The network exposure function network element may be used for functions such as exposing an event and a capability of a core network, mutual translation between an external parameter of the core network and an internal parameter of the core network, receiving and storing identification information provided by an external network element of the core network, and selecting a core network element. The external network element of the core network may include an application server and the like.

For example, that the first application server sends a second message to the first policy control network element may include:

the first application server is configured to send the second message to a network exposure network element, where the network exposure network element is configured to: receive the second message, and send the second message to the first policy control network element after performing authentication and authorization on the second message, and the first policy control network element receives the second message from the network exposure network element.

It should be noted that FIG. 2*a* or FIG. 2*b* is merely an example diagram of the architecture. In addition to the functional units shown in FIG. 2*a* or FIG. 2*b*, the system may further include another functional network element, for example, an operation and management (O&M) network element. This is not limited in this embodiment of this application. In addition, names of the devices in FIG. 2*a* or FIG. 2*b* are not limited. The devices may alternatively have other names in addition to the names shown in FIG. 2*a* or FIG. 2*b*. For example, the names are replaced with names of network elements having same or similar functions. This is not limited.

The communication system shown in FIG. 2*a* may be a 3rd generation partnership project (3GPP) communication system, for example, a 4th generation (4G) communication system or a long term evolution (LTE) system, or may be a 5th generation (5G) communication system, a new radio (NR) system, or a next-generation communication system, or may be a non-3GPP communication system. This is not limited.

Figure 3A:
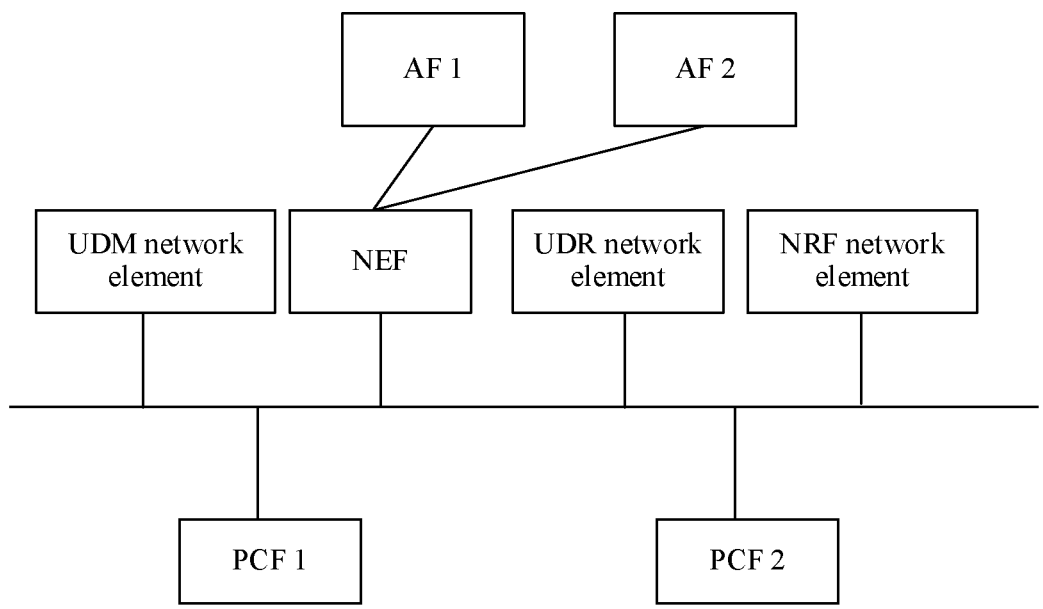
FIG. 3*a* is a schematic diagram of an architecture of a 5G communication system according to an embodiment of this application.

For example, the communication system shown in FIG. 2*a* is a 5G communication system shown in FIG. 3*a*. As shown in FIG. 3*a*, a policy control network element may be a policy control function (PCF) in the 5G communication system, a network element or an entity corresponding to the network exposure function network element may be a network exposure function (NEF) in the 5G communication system, and a network element or an entity corresponding to the first network element may be an NRF network element, a UDR network element, or a UDM network element in the 5G communication system.

Figure 3B:
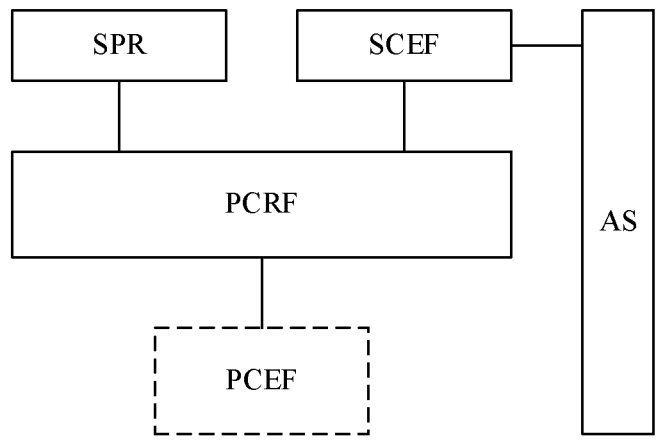
FIG. 3*b* is a schematic diagram of an architecture of a 4G communication system according to an embodiment of this application.

For example, the communication system shown in FIG. 2a is a 4G communication system shown in FIG. 3b. As shown in FIG. 3b, the policy control network element may be a policy and charging rules function (PCRF) in the 4G communication system, a network element or an entity corresponding to the network exposure function network element may be a service capability exposure function (SCEF) in the 4G communication system, and a network element or an entity corresponding to the first network element may be a subscription profile repository (SPR) in the 4G communication system. Further, as shown in FIG. 3b, the 4G communication system may further include a policy and charging enforcement function (PCEF).

Optionally, the policy control network element in embodiments of this application may also be referred to as a communication apparatus, and may be a general-purpose device or a dedicated device. This is not specifically limited in embodiments of this application.

Optionally, a related function of the policy control network element in embodiments of this application may be implemented by one device, may be jointly implemented by a plurality of devices, or may be implemented by one or more functional modules in one device. This is not specifically limited in embodiments of this application. It may be understood that the foregoing function may be a network element in a hardware device, may be a software function running on dedicated hardware, a combination of hardware and software, or a virtualization function instantiated on a platform (for example, a cloud platform).

Figure 4:
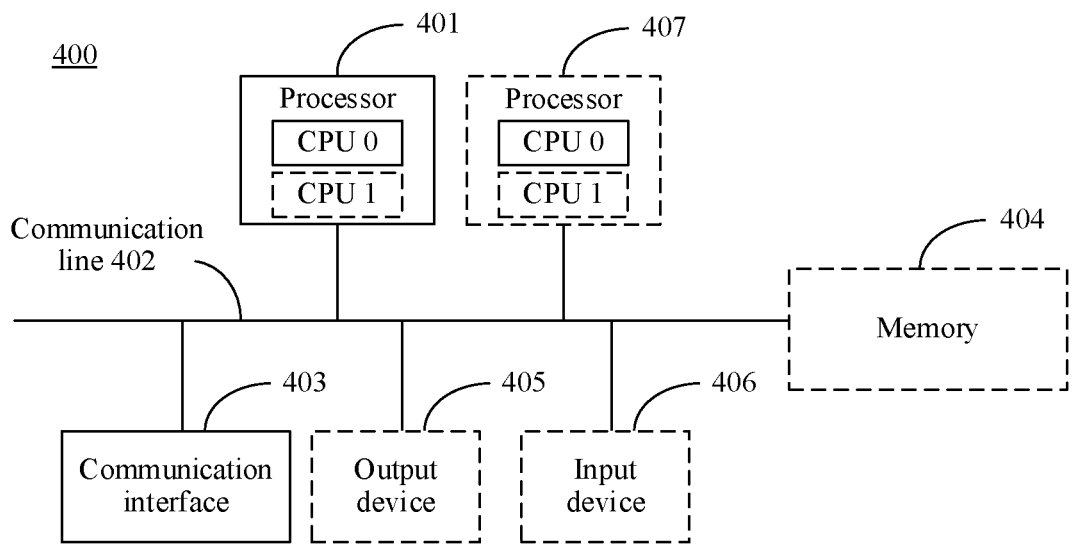
FIG. 4 is a schematic composition diagram of a communication apparatus 400 according to an embodiment of this application.

During specific implementation, each device (for example, a policy control network element) shown in FIG. 2a may use a composition structure shown in FIG. 4, or include components shown in FIG. 4. FIG. 4 is a schematic composition diagram of a communication apparatus 400 according to an embodiment of this application. The communication apparatus 400 may include a processor 401 and a memory 404. Further, the communication apparatus 400 may further include a communication line 402 and a communication interface 403. The processor 401, the memory 404, and the communication interface 403 may be connected to each other through the communication line 402.

The processor 401 may be a central processing unit (CPU), a general-purpose processor, a network processor (NP), a digital signal processor (DSP), a microprocessor, a microcontroller, a programmable logic device (PLD), or any combination thereof. The processor 401 may alternatively be another apparatus having a processing function, for example, a circuit, a component, or a software module. This is not limited.

The communication line 402 is configured to transmit information between the components included in the communication apparatus 400.

The communication interface 403 is configured to communicate with another device or another communication network. The another communication network may be an Ethernet, a radio access network (RAN), a wireless local area network (WLAN), or the like. The communication interface 403 may be a module, a circuit, a transceiver, or any apparatus that can implement communication.

The memory 404 is configured to store instructions. The instructions may be a computer program.

The memory 404 may be a read-only memory (ROM) or another type of static storage device that can store static information and/or instructions; may be a random access memory (RAM) or another type of dynamic storage device that can store information and/or instructions; or may be an electrically erasable programmable read-only memory (EEPROM), a compact disc read-only memory (CD-ROM) or another compact disc storage, optical disc storage (including a compressed optical disc, a laser disc, an optical disc, a digital universal optical disc, and a Blu-ray optical disc), magnetic disk storage medium, or another magnetic storage device. This is not limited.

It should be noted that the memory 404 may exist independently of the processor 401, or may be integrated into the processor 401. The memory 404 may be configured to store instructions, program code, some data, or the like. The memory 404 may be located inside the communication apparatus 400, or may be located outside the communication apparatus 400. This is not limited.

The processor 401 is configured to execute the instructions stored in the memory 404, to implement a background data transfer policy formulation method provided in the following embodiments of this application. For example, when the communication apparatus 400 is a session management network element, or a chip or a system-on-a-chip in the session management network element, the processor 401 executes instructions stored in the memory 404, to implement steps performed by the session management network element in the following embodiments of this application. For another example, when the communication apparatus 400 is a mobility management network element, or a chip or a system-on-a-chip in the mobility management network element, the processor 401 may execute the instructions stored in the memory 404, to implement steps performed by the mobility management network element in the following embodiments of this application.

In an example, the processor 401 may include one or more CPUs, for example, CPU 0 and CPU 1 in FIG. 4.

In an optional implementation, the communication apparatus 400 includes a plurality of processors. For example, the communication apparatus 400 may further include a processor 407 in addition to the processor 401 in FIG. 4.

In an optional implementation, the communication apparatus 400 further includes an output device 405 and an input device 406. For example, the input device 406 is a device such as a keyboard, a mouse, a microphone, or a joystick, and the output device 405 is a device such as a display screen or a speaker.

It should be noted that the communication apparatus 400 may be a desktop computer, a portable computer, a network server, a mobile phone, a tablet computer, a wireless terminal, an embedded device, a chip system, or a device having a structure similar to that in FIG. 4. In addition, the composition structure shown in FIG. 4 does not constitute a limitation on the communication apparatus. In addition to the components shown in FIG. 4, the communication apparatus may include more or fewer components than those shown in the figure, or some components may be combined, or different component arrangements may be used.

In this embodiment of this application, the chip system may include a chip, or may include a chip and another discrete component.

In addition, actions, terms, and the like in embodiments of this application may be mutually referenced. This is not limited. Names of messages exchanged between devices, names of parameters in the messages, or the like in embodiments of this application are merely examples, and other names may also be used during specific implementation. This is not limited.

With reference to the communication system shown in FIG. 2a, the following describes a background data transfer policy formulation method according to an embodiment of this application. Network elements in the following embodiments may have components shown in FIG. 4. Details are not described again. It should be noted that names of messages exchanged between devices, names of parameters in the messages, or the like in embodiments of this application are merely examples, and other names may also be used in specific implementation. For example, formulation described in embodiments of this application may be replaced with terms such as decision-making and negotiation. "Determine" in embodiments of this application may also be understood as "create" or "generate". "Include" in embodiments of this application may also be understood as "carry". "Formulate" in embodiments of this application may also be understood as "decide", "determine", or the like. This is uniformly described herein. This is not specifically limited in embodiments of this application.

Figure 5:
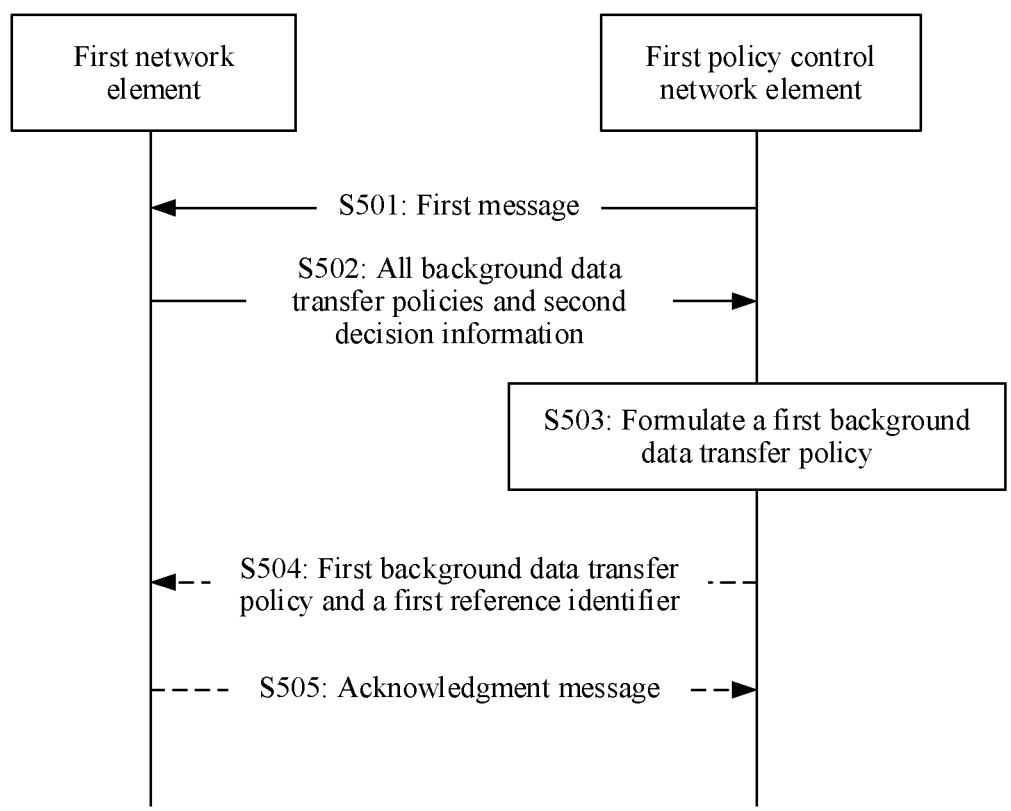
FIG. 5 is a flowchart of a background data transfer policy formulation method according to an embodiment of this application.

FIG. 5 is a flowchart of a background data transfer policy formulation method according to an embodiment of this application. As shown in FIG. 5, the method may include the following steps.

S501: A first policy control network element sends a first message to a first network element. Correspondingly, the first network element receives the first message.

The first policy control network element may be any policy control network element in the communication system shown in FIG. 2a.

The first network element may be a UDR network element, a UDM network element, an NRF network element, another network element that can store a background data transfer policy, or the like. The first network element may correspondingly store the background data transfer policy and a reference identifier of the background data transfer policy in the first network element in a list or in an array form. For example, the background data transfer policy and the reference identifier of the background data transfer policy are correspondingly stored in the list. In an initial state, the list is empty. After receiving a background data transfer policy and a reference identifier of the background data transfer policy that are sent by a policy control network element, the first network element correspondingly stores, in the list, the background data transfer policy and the reference identifier of the background data transfer policy. For related descriptions of the background data transfer policy, refer to the foregoing descriptions. Details are not described again.

Further, the first network element may further store decision information corresponding to a background data transfer policy that is being formulated, and the decision information and a reference identifier corresponding to the background data transfer policy that is being formulated may be correspondingly stored in the first network element. For example, a correspondence between the decision information corresponding to the background data transfer policy that is being formulated and the reference identifier may be included in a same list as a correspondence between a background data transfer policy that has been formulated and a reference identifier of the background data transfer policy. For example, the following Table 1 shows background data transfer policies that already exist in the first network element and the decision information corresponding to the background data transfer policy that is being formulated. As shown in Table 1, the first network element stores a background data transfer policy 1 and a background data transfer policy 2, and further stores decision information 1 corresponding to a background data transfer policy whose reference identifier is reference ID 3. Formulation of the background data transfer policy whose reference identifier is reference ID 3 is not completed or the background data transfer policy whose reference identifier is reference ID 3 is being formulated, that is, the background data transfer policy whose reference identifier is reference ID 3 is being negotiated. If a background data transfer policy 3 corresponding to reference ID 3 already exists, the decision information 1 also indicates that background data transfer policy 3 is not a valid background data transfer policy.

TABLE 1

| Reference identifier | Background data transfer policy |
|---|---|
| reference ID 1 | Background data transfer policy 1 |
| reference ID 2 | Background data transfer policy 2 |
| reference ID 3 | Decision information 1 |

The first message may be used to request all background data transfer policies stored in the first network element. Alternatively, the first message may be used to request all existing/stored/formulated background data transfer policies. The first message may be a data management (DM) _query request (DM_query request) provided by an interface between the first network element and the first policy control network element. The first message may include a first reference identifier and first decision information, the first reference identifier may identify a first background data transfer policy, and the first reference identifier is allocated by the first policy control network element. The first decision information may be information that is provided by a first application server for the first policy control network element and that can be used to formulate/decide/adjust the first background data transfer policy. The first decision information may include one or more of information such as a quantity of first terminals, a first time window, information about a first network area, first traffic generated when each terminal transfers background data, an indication that the first background data transfer policy is being negotiated, or a reason for formulating the first background data transfer policy.

It should be noted that, if the first background data transfer policy is formulated initially/for the first time, the reason for formulating the first background data transfer policy may not be carried; and if the first background data transfer policy is adjusted, the reason for formulating the first background data transfer policy may be carried. The reason for formulating the first background data transfer policy may be that network performance deteriorates, network performance recovers, a carrier policy changes, or the like.

This application is not limited to including the first reference identifier and the first decision information in the first message and sending the first message to the first network element. The first policy control network element may alternatively send the first reference identifier and the first decision information to the first network element based on another message, so that the first network element stores the information about the first reference identifier and the first decision information. For example, the first policy control network element may send a third message to the first network element, where the third message includes the first reference identifier and the first decision information. The first policy control network element may indicate, in the following manner, that the first background data transfer policy is being formulated (in other words, being negotiated): The first policy control network element may use a special information element to carry the first decision information to indicate that the background data transfer policy corresponding to the first reference identifier is being formulated (in other words, being negotiated) (that is, indicate that an existing background data transfer policy corresponding to the first reference identifier is not a valid background data transfer policy, and this is the same below), include a special identifier in the first decision information to indicate that the background data transfer policy corresponding to the first reference identifier is being formulated (in other words, being negotiated), or use the reason for formulating the first background data transfer policy to indicate that the background data transfer policy corresponding to the first reference identifier is being formulated (in other words, being negotiated).

The quantity of first terminals may be an estimated quantity of terminals that transfer background data by using the first background data transfer policy. The first traffic generated when the terminal transfers the background data may be a maximum transfer rate required when the terminal transfers the background data. For related descriptions of the first time window and the information about the first network area, refer to the foregoing descriptions. Details are not described again.

In an example, after receiving a second message sent by the first application server, the first policy control network element is triggered to send the first message to the first network element.

The second message may be used to request to formulate the first background data transfer policy. The second message may include the first decision information, and may further include an identifier of the first application server, other information, and the like. This is not limited.

The identifier of the first application server may identify the first application server, and the identifier of the first application server may be an internet protocol (IP) address, a first media access control (MAC) address, or the like of the first application server.

Specifically, when a user has a requirement for transferring the background data, the user may trigger an application layer of the terminal to send a transfer request to the first application server. The transfer request may carry a time period, a transfer rate, and the like expected by the user for transferring the background data. After receiving the transfer request, the first application server determines the first decision information based on the transfer request, and sends the second message to the first policy control network element. For example, it is assumed that current time is 2:00 p.m., and the user wants to download a film whose size is 200 MB during working hours (before 6:00 p.m.). The user may trigger the application layer of the terminal to send the requirement to the application server. The application server generates decision information based on the requirement, sends a second message carrying the decision information to the first policy control network element, and triggers the first policy control network element to formulate a corresponding background data transfer policy, so that the user can enjoy the film at home after work.

When the first application server is an application server deployed by a third party, the first application server may send the second message to the first policy control network element via a network exposure network element. For example, the first application server sends the second message to the network exposure network element, and the network exposure network element sends the second message to the first policy control network element after performing authentication and authorization on the second message. Alternatively, when the first application server is an application server deployed by a carrier, the first application server may directly send the second message to the first policy control network element.

In still another example, before S501 is performed, the first policy control network element has formulated a background data transfer policy, for example, a third background data transfer policy, based on the first decision information. When determining that a network performance indicator in a time window of the third background data transfer policy is lower than a preset threshold, the first policy control network element is triggered to send the first message to the first network element. Alternatively, before S501 is performed, the first policy control network element has formulated a background data transfer policy, for example, a third background data transfer policy, based on the first decision information, and a network performance indicator used during background data transfer according to the third background data transfer policy is poor, for example, lower than a preset threshold. In this case, when determining that the network performance indicator in a time window of the third background data transfer policy is restored to the preset threshold, the first policy control network element is triggered to send the first message to the first network element. In this case, that the first policy control network element formulates the first background data transfer policy may be replaced with that the first policy control network element adjusts the third background data transfer policy to obtain the first background data transfer policy. The third background data transfer policy may be referred to as a background data transfer policy before adjustment, and the first background data transfer policy may be a background data transfer policy after adjustment. In this case, a special information element is used to carry the first decision information, the first decision information includes an indication that a background data transfer policy is being formulated, or a reason for formulating a background data transfer policy is used. The first decision information further indicates that the third background data transfer policy is not a valid background data transfer policy.

The preset threshold may be set based on a requirement, and the preset threshold may be set by the carrier. For example, the carrier sets the preset threshold based on a level of the user, a QoS requirement of the user, an authorized bandwidth, and the like.

The first policy control network element may determine whether the network performance indicator is lower than or restored to the preset threshold, or learn, from another network element, whether the network performance indicator is lower than or restored to the preset threshold. For example, the first policy control network element sends a subscription request to a network data analytics function (NWDAF), where the subscription request is used to obtain a network performance indicator event, and the network performance indicator event is an event that the network performance indicator in the time window of the third background data transfer policy is lower than or restored to the preset threshold. The first policy control network element receives the network performance indicator event notified by the NWDAF. The network performance indicator may include a transfer rate, a transfer bandwidth, and the like.

For a method in which the first policy control network element sends the third message to the first network element, where the third message includes the first reference identifier and the first decision information, the first policy control network element first sends the first message to the first network element, to request the background data transfer policies stored in the first network element. The first network element sends, to the first policy control network element, the stored background data transfer policies and corresponding decision information that include the third background data transfer policy and the first decision information used to decide the third background data transfer policy (where the first decision information is also used to decide the first background data transfer policy) (in this case, the first decision information does not include the indication that a background data transfer policy is being negotiated or the reason for formulating a background data transfer policy). After the first policy control network element determines to re-formulate the first background data transfer policy, the first policy control network element sends updated first decision information to the first network element based on the third message. The first policy control network element may use the special information element to carry the first decision information to indicate that the background data transfer policy corresponding to the first reference identifier is being formulated (in other words, being negotiated), include the special identifier in the first decision information to indicate that the background data transfer policy corresponding to the first reference identifier is being formulated (in other words, being negotiated), or use the reason for formulating the first background data transfer policy to indicate that the background data transfer policy corresponding to the first reference identifier is being formulated (in other words, being negotiated).

S502: The first network element sends, to the first policy control network element based on the first message, all the background data transfer policies stored in the first network element and second decision information. Correspondingly, the first policy control network element obtains, from the first network element, all the background data transfer policies stored in the first network element and the second decision information.

The second decision information may be decision information that is stored in the first network element and that is used to formulate a second background data transfer policy. Formulation of the second background data transfer policy corresponding to the second decision information is not completed or the second background data transfer policy corresponding to the second decision information is being formulated (in other words, being negotiated). The second decision information may be provided by a second application server to a second policy control network element. When requesting all the existing background data transfer policies from the first network element, the second policy control network element sends, to the first network element, the second decision information and a second reference identifier that is allocated by the second policy control network element to the second background data transfer policy. The first network element receives and correspondingly stores the second decision information and the second reference identifier. Alternatively, the second policy control network element sends a second reference identifier and the second decision information to the first network element based on another message. The second policy control network element may be the same as or different from the first policy control network element, and the second application server may be the same as or different from the first application server. This is not limited.

The second decision information may include one or more of information such as a quantity of second terminals, a second time window, information about a second network area, second traffic generated when each terminal transfers background data, an indication that the second background data transfer policy is being negotiated, or a reason for formulating the second background data transfer policy. The first network element may use a special information element to carry the second decision information to indicate that the second background data transfer policy is being formulated (in other words, being negotiated), include a special identifier in the second decision information to indicate the second background data transfer policy is being negotiated, or use the reason for formulating the second background data transfer policy in the second decision information to indicate that the second background data transfer policy is being formulated (in other words, being negotiated).

For example, the second decision information is the decision information 1 in Table 1. After receiving the first message, the first network element may query Table 1, and send the background data transfer policy 1, the background data transfer policy 2, and the decision information 1 to the first policy control network element.

For example, the first network element may send, to the first policy control network element, a data management-_query response (DM_query response) provided by the interface between the first network element and the first policy control network element. The DM_query response may include all the background data transfer policies stored in the first network element and the second decision information.

Further, the first network element may store a correspondence between the first decision information and the first reference identifier, for example, store, in the foregoing Table 1, the correspondence between the first decision information and the first reference identifier.

S503: The first policy control network element formulates the first background data transfer policy based on the first decision information and the second decision information and according to all the background data transfer policies stored in the first network element.

For example, the first policy control network element may determine whether the second decision information affects formulation of the first background data transfer policy. If the second decision information does not affect formulation of the first background data transfer policy, the first policy control network element may formulate the first background data transfer policy in the manner shown in FIG. 1. If the second decision information affects formulation of the first background data transfer policy, the first policy control network element may formulate the first background data transfer policy in the following Manner 1, Manner 2, or Manner 3. For a related definition of a case in which the second decision information affects formulation of the first background data transfer policy, refer to the foregoing descriptions. Details are not described again.

Manner 1: The first policy control network element formulates the first background data transfer policy based on the first decision information and the second decision information and according to all the background data transfer policies stored in the first network element, where execution of the first background data transfer policy and execution of the second background data transfer policy do not affect each other.

The first policy control network element may continue to formulate the first background data transfer policy in the manner shown in FIG. 1, in other words, formulate the first background data transfer policy and the second background data transfer policy simultaneously or concurrently. However, after the formulation is completed, when data is transferred according to the background data transfer policy, execution of the first background data transfer policy and execution of the second background data transfer policy do not affect each other as required/ensured. For example, execution of the first background data transfer policy and execution of the second background data transfer policy meet one or both of the following: a time window of the first background data transfer policy does not overlap a time window of the second background data transfer policy, and a maximum transfer rate used when the first background data transfer policy and the second background data transfer policy are simultaneously executed in a same network area does not exceed a preset threshold that is of a network performance indicator and that is set by the carrier.

Manner 2: The first policy control network element delays formulation of the first background data transfer policy. For example, after the first policy control network element obtains the second background data transfer policy, in other words, after formulation of the second background data transfer policy is completed, and no other background data transfer policy that is being formulated exists in a network, the first policy control network element may formulate the first background data transfer policy based on the first decision information and according to all the background data transfer policies stored in the first network element and the second background data transfer policy.

In Manner 2, that the first policy control network element obtains the second background data transfer policy may include: The second policy control network element is different from the first policy control network element. The first policy control network element obtains the second background data transfer policy from the first network element. For example, the second policy control network element may receive the second decision information from the second application server, and send the second decision information to the first network element. In addition, the second policy control network element obtains, from the first network element, all the background data transfer policies stored in the first network element, and formulates candidate background data transfer policies according to all the background data transfer policies stored in the first network element and based on the second decision information and other information. Through interaction with the second application server, the second policy control network element finally selects the second background data transfer policy from the formulated candidate background data transfer policies, and sends the second background data transfer policy to the first network element, to trigger the first network element to send the second background data transfer policy to the first policy control network element. Alternatively, in another possible design, the second policy control network element is the same as the first policy control network element. After receiving the second decision information from the second application server, the second policy control network element obtains, from the first network element, all the background data transfer policies stored in the first network element, formulates candidate background data transfer policies according to all the background data transfer policies stored in the first network element and based on the second decision information and other information, and finally selects the second background data transfer policy from the formulated candidate background data transfer policies through interaction with the second application server.

Manner 3: The first policy control network element delays formulation of the first background data transfer policy. For example, the second policy control network element fails to negotiate the second background data transfer policy with the second application server. The second policy control network element requests the first network element to delete the second decision information, and the first network element requests the first policy control network element to delete the second decision information. For example, the first network element may send a deletion indication corresponding to the second decision information to the first policy control network element. After obtaining the deletion indication corresponding to the second decision information, the first policy control network element formulates the first background data transfer policy based on the first decision information and according to all the background data transfer policies stored in the first network element.

The deletion indication corresponding to the second decision information may be replaced with a deletion indication corresponding to the second reference identifier, and the deletion indication corresponding to the second decision information may indicate to delete the second decision information and/or the stored second background data transfer policy corresponding to the second decision information.

It should be noted that, when the first policy control network element obtains, from the first network element, the second background data transfer policy or the deletion indication corresponding to the second decision information, before S502 is performed, the method further includes: The first policy control network element subscribes to a first event from the first network element, where the first event is an event notification indicating that the background data transfer policy stored in the first network element/the decision information changes, so that when the stored background data transfer policy changes, the first network element notifies the first policy control network element of the changed background data transfer policy, notifies the first policy control network element of all background data transfer policies in the first network element that are after the change, or notifies the first policy control network element of a change status of the decision information. A change of a background data transfer policy may include adding a background data transfer policy, deleting a background data transfer policy, updating a background data transfer policy, or the like. A change of decision information may include deleting decision information, updating content included in decision information, adding new decision information, or the like.

In Manner 2, the first policy control network element may formulate the first background data transfer policy in the manner shown in FIG. 1. For example, the first policy control network element may formulate one or more candidate background data transfer policies according to all background data transfer policies (including the second background data transfer policy) stored in the first network element and a carrier policy and based on the first decision information, a current network status, and the like, to formulate the candidate background data transfer policies including the first background data transfer policy, so that the first application server selects the first background data transfer policy from the candidate background data transfer policies.

In Manner 3, the first policy control network element may formulate the first background data transfer policy in the manner shown in FIG. 1. For example, the first policy control network element may formulate one or more candidate background data transfer policies according to all the background data transfer policies stored in the first network element and a carrier policy and based on the first decision information, a current network status, and the like, to formulate the candidate background data transfer policies including the first background data transfer policy, so that the first application server selects the first background data transfer policy from the candidate background data transfer policies.

The first decision information may be obtained by the first policy control network element from the first network element, or may be locally stored by the first policy control network element.

Further, the method shown in FIG. 5 may further include the following steps.

S504: The first policy control network element sends the first background data transfer policy and the first reference identifier to the first network element.

For example, the first policy control network element may send, to the first network element, a data management_update request (DM_update request) provided by the interface between the first network element and the first policy control network element, where the DM_update request carries the first background data transfer policy and the first reference identifier.

S505: The first network element receives the first background data transfer policy and the first reference identifier, correspondingly stores the first background data transfer policy and the first reference identifier, and sends an acknowledgment message to the first policy control network element.

The acknowledgment message may be a data management_update response (DM_update response) provided by the interface between the first network element and the first policy control network element.

It should be noted that, before S504, to be specific, before formulation of the first background data transfer policy is completed, if a third application server requests a third policy control network element to formulate a background data transfer policy based on third decision information, and the third policy control network element requests the existing background data transfer policies from the first network element, the first network element may send all the existing background data transfer policies and the first decision information to the third policy control network element, so that the third policy control network element formulates the background data transfer policy based on the third decision information and the first decision information and according to the existing background data transfer policies, thereby avoiding a conflict caused when a plurality of background data transfer policies are simultaneously formulated. The first policy control network element, the second policy control network element, and the third policy control network element may be the same or different. This is not limited.

Based on the method shown in FIG. 5, when formulating a background data transfer policy, a policy control network element not only refers to existing background data transfer policies, but also refers to decision information required for formulating a background data transfer policy by another policy control network element, so as to avoid a conflict between the formulated background data transfer policy and another background data transfer policy, and ensure availability of the background data transfer policy.

With reference to the 5G communication system shown in FIG. 3a, the following uses an example in which a policy control network element is a PCF (where for example, a first policy control network element is PCF 2, and a second policy control network element is PCF 1), an application server is an AF (where for example, a first application server is AF 2, and a second application server is AF 1), a first network element is a UDR network element, a first background data transfer policy is a background data transfer policy 2, a second background data transfer policy is a background data transfer policy 1, first decision information is decision information 2, and second decision information is decision information 1, to describe the background data transfer policy formulation method provided in this embodiment of this application.

Figure 6A:
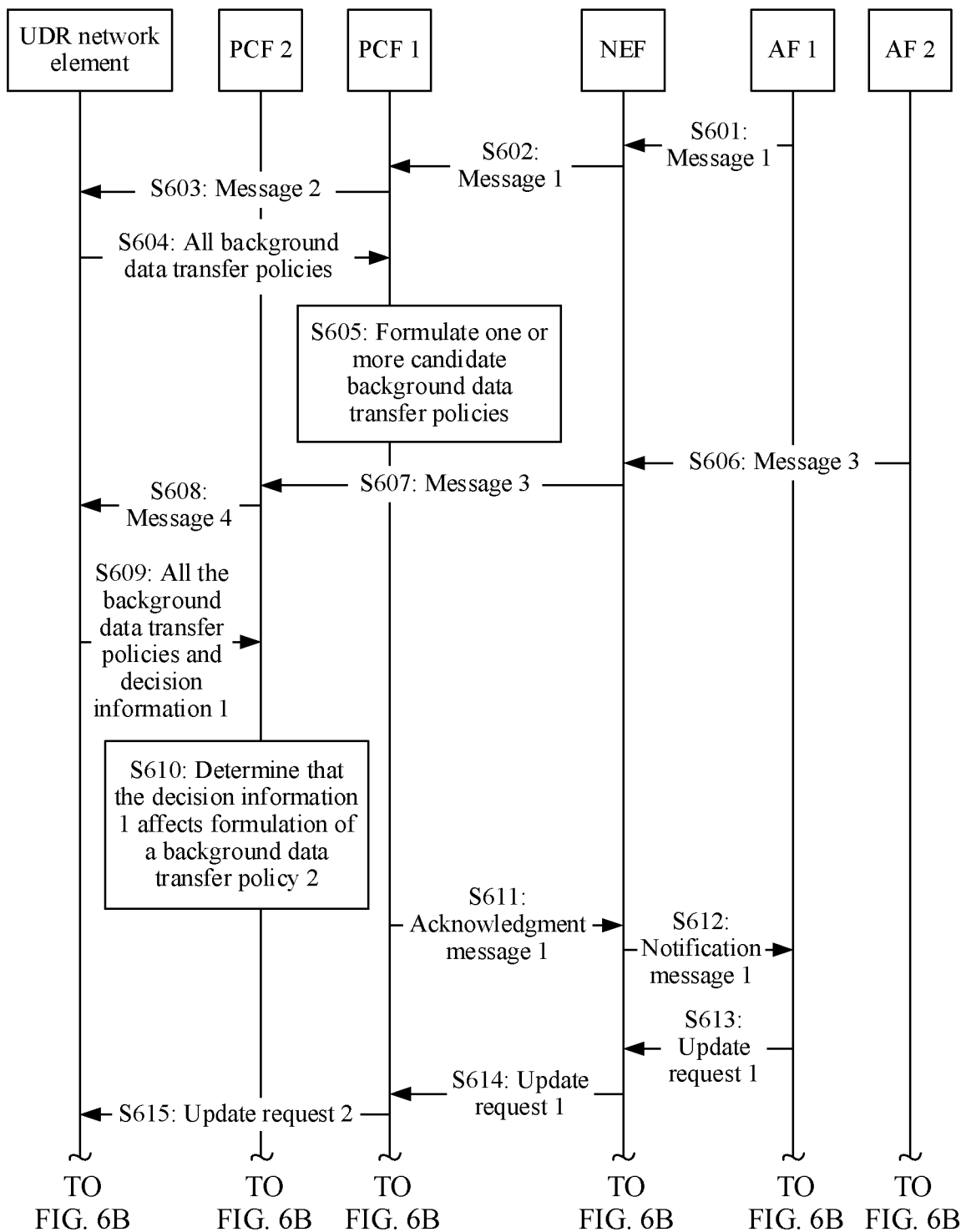
FIG. 6A and FIG. 6B are a flowchart of a background data transfer policy formulation method according to an embodiment of this application.
Figure 6B:
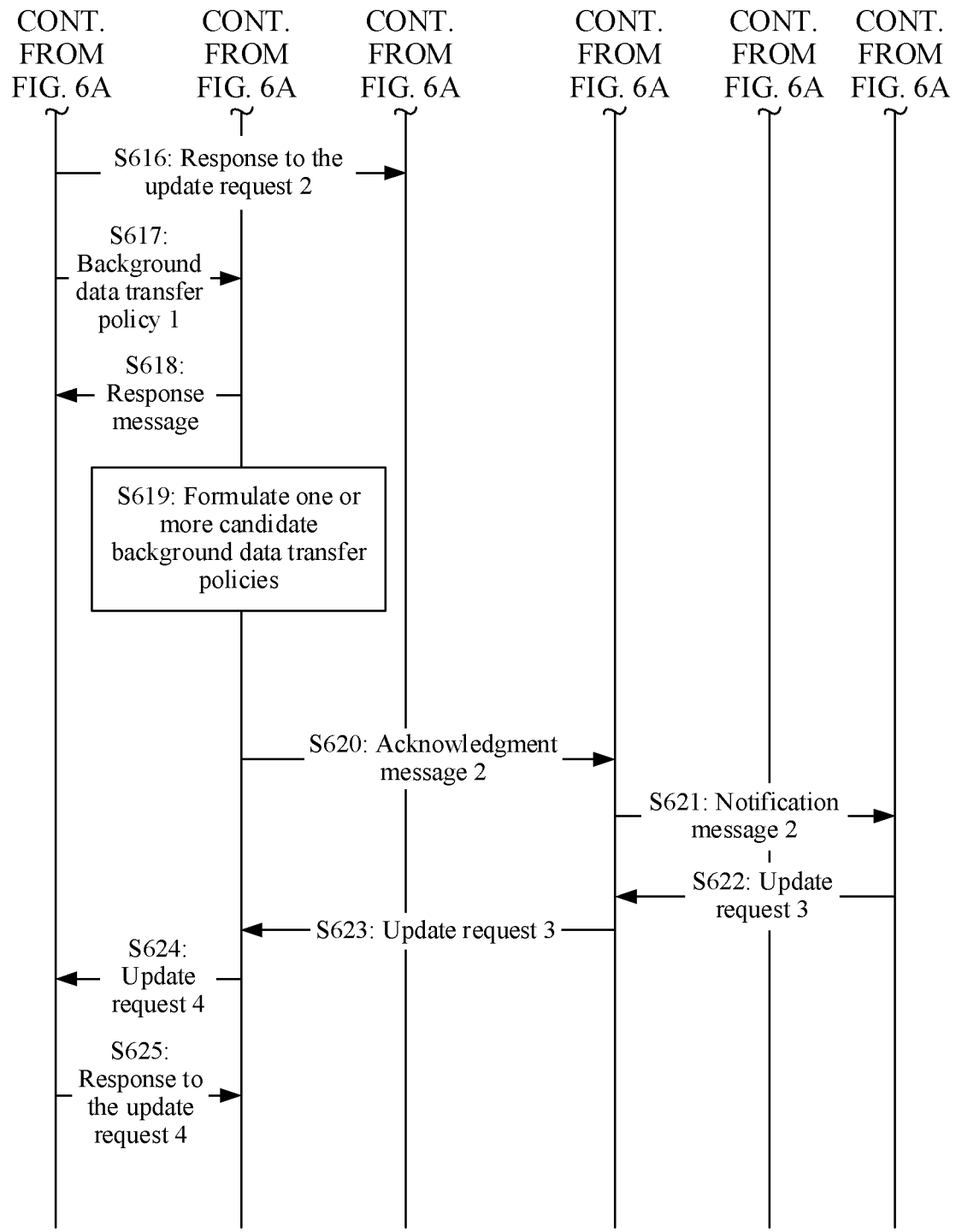

FIG. 6A and FIG. 6B are a flowchart of a background data transfer policy formulation method according to an embodiment of this application. As shown in FIG. 6A and FIG. 6B, the method may include the following steps.

S601: AF 1 sends a message 1 to an NEF.

AF 1 may be any AF that provides background data in the system shown in FIG. 3a.

The message 1 may be used to request to formulate a background data transfer policy 1, the message 1 may be a background data transfer policy negotiation_create request (Nnef_BDTPNegotiation_Create request) provided by a Nnef interface, the message 1 may carry an identifier of AF 1 and decision information 1, and the decision information 1 may be used to formulate the background data transfer policy 1. The decision information 1 may include one or more of information such as a quantity of first terminals, a first time window, information about a first network area, first traffic generated when each terminal transfers background data, or a reason for formulating the background data transfer policy 1. It should be noted that, if AF 1 initially formulates the background data transfer policy 1, the reason for formulating the background data transfer policy 1 may not be carried.

S602: The NEF receives the message 1, and performs check and authorization on the message 1. The NEF successfully authorizes the message 1, and the NEF sends a message 1 to PCF 1.

For example, the NEF may check, based on an ID that is of AF 1 and that is carried in the message 1, whether AF 1 identified by the ID subscribes to a network, for example, whether a third-party provider subscribes to a carrier. If there is the subscription, authorization succeeds; otherwise, authorization fails, and the procedure ends.

PCF 1 may be a PCF that can provide a policy formulation service for AF 1.

For example, the message 1 sent by AF 1 to the NEF and the message 1 sent by the NEF to PCF 1 may carry same content, but message types of the two messages may be different. For example, the message 1 sent by the NEF to PCF 1 may be a background data transfer policy control_create request (Npcf_BDTPolicyControl_Create request) provided by a Npcf interface, and the message 1 sent by the NEF to PCF 1 may include the decision information 1, and may further include the ID of AF 1.

It should be noted that although information that is about the first network area and that is sent by AF 1 to the NEF and information that is about the first network area and that is sent by the NEF to PCF 1 identify the same area, information formats of the two are different. The information that is about the first network area and that is sent by AF 1 to the NEF may be network area information that can be identified by a third party, for example, a geographical location in a 3GPP network. The information that is about the first network area and that is sent by the NEF to PCF 1 may be network area information that can be identified by a core network element, for example, a cell identifier.

S603: PCF 1 receives the message 1, and sends a message 2 to a UDR network element.

The message 2 may be a data management_query request (Nudr_DM_query request) provided by a Nudr interface. The message 2 is used to request all background data transfer policies stored in the UDR network element. The message 2 may carry a reference identifier reference Id 1 allocated by PCF 1 to the background data transfer policy 1 and the received decision information 1. This application is not limited to including reference Id 1 and the decision information 1 in the message 2 and sending the message 2 to the UDR. Alternatively, PCF 1 may send reference Id 1 and the decision information 1 to the UDR based on another message.

In addition to content described in S601, the decision information 1 may further include an indication that the background data transfer policy 1 is being formulated (in other words, being negotiated). For example, PCF 1 may use a special information element to carry the decision information 1 to indicate that the background data transfer policy corresponding to reference Id 1 is being negotiated, include a special identifier in the decision information 1 to indicate that the background data transfer policy corresponding to reference Id 1 is being negotiated, or use the reason for formulating the background data transfer policy 1 in the decision information 1 to indicate that the background data transfer policy corresponding to reference Id 1 is being negotiated.

S604: The UDR network element receives the message 2, and returns, to PCF 1, all the background data transfer policies stored in the UDR network element.

Further, the UDR network element correspondingly stores the decision information 1 and reference Id 1.

It should be noted that, in this case, if the UDR network element stores decision information required for formulating a background data transfer policy by another PCF, the UDR network element further returns the decision information stored in the UDR network element.

S605: PCF 1 receives all the background data transfer policies stored in the UDR network element, and formulates one or more candidate background data transfer policies according to a carrier policy and all the background data transfer policies stored in the UDR network element and based on a current network status and the like.

The candidate background data transfer policy is a background data transfer policy that may be selected by AF 1 as the background data transfer policy 1. A candidate background data transfer policy may include one or more of information such as a policy identifier, a recommended transfer time window, a maximum aggregate bit rate, and a rating group identifier.

For example, for a process in which PCF 1 formulates the one or more candidate background data transfer policies according to the carrier policy and all the background data transfer policies stored in the UDR network element and based on the current network status and the like, refer to a conventional technology. Details are not described.

Further, after formulating the one or more candidate background data transfer policies, PCF 1 performs S106 to S113 shown in FIG. 1. In a process in which PCF 1 performs S106 to S113, another PCF may also formulate a background data transfer policy. For example, PCF 2 also formulates a background data transfer policy. That is, two or more PCFs simultaneously formulate background data transfer policies. Specifically, the process is shown in the following steps.

S606: AF 2 sends a message 3 to the NEF.

The message 3 may be a Nnef_BDTPNegotiation_Create request, the message 3 may include an ID of AF 2 and decision information 2, the ID of AF 2 may identify AF 2, descriptions of the decision information 2 is the same as those of the decision information 1, and the decision information 2 may be used to formulate a background data transfer policy 2. For example, the decision information 2 may include one or more of information such as a quantity of second terminals, a second time window, information about a second network area, second traffic generated when each terminal transfers background data, or a reason for formulating the background data transfer policy 2. It should be noted that, if AF 2 initially formulates the background data transfer policy 2, the reason for formulating the background data transfer policy 2 may not be carried.

S607: The NEF receives the message 3, and performs check and authorization on the message 3. The NEF successfully authorizes the message 3, and the NEF sends a message 3 to PCF 2.

For S607, refer to S602. Details are not described again.

S608: PCF 2 receives the message 3, and sends a message 4 to the UDR network element.

The message 4 may be a Nudr_DM_query request, the message 4 may be similar to the foregoing message 2, the message 4 may be used to request to obtain all the background data transfer policies that already exist/that are stored in the UDR network element, and the message 4 may include reference Id 2 allocated by PCF 2 to the background data transfer policy 2 and the decision information 2. This application is not limited to including reference Id 2 and the decision information 2 in the message 4 and sending the message 4 to the UDR. Alternatively, PCF 2 may send reference Id 2 and the decision information 2 to the UDR based on another message.

In addition to content described in S606, the decision information 2 may further include an indication that the background data transfer policy 2 is being negotiated. For example, PCF 2 may use a special information element to carry the decision information 2 to indicate that the background data transfer policy corresponding to reference Id 2 is being negotiated, include a special identifier in the decision information 2 to indicate that the background data transfer policy corresponding to reference Id 2 is being negotiated, or use the reason for formulating the background data transfer policy 2 in the decision information 2 to indicate that the background data transfer policy corresponding to reference Id 2 is being negotiated.

S609: The UDR network element receives the message 4, and returns, to PCF 2, all the existing background data transfer policies and the decision information 1 that is received in S604.

Further, the UDR network element correspondingly stores reference Id 2 and the decision information 2.

The UDR may use a special information element to carry the decision information 1 to indicate that the background data transfer policy corresponding to reference Id 1 is being negotiated, include a special identifier in the decision information 1 to indicate that the background data transfer policy corresponding to reference Id 1 is being negotiated, or use a value of the reason for formulating the background data transfer policy 1 in the decision information 1 to indicate that the background data transfer policy corresponding to reference Id 1 is being negotiated.

S610: PCF 2 determines that the decision information 1 affects formulation of the background data transfer policy 2.

That the decision information 1 affects formulation of the background data transfer policy 2 may include one or both of the following: the first time window overlaps the second time window, or the network area indicated by the information about the first network area overlaps the network area indicated by the information about the second network area.

Further, PCF 2 does not delay deciding. Instead, refer to S105 to S113 shown in FIG. 1. PCF 2 formulates one or more candidate background data transfer policies, and indicates the one or more candidate background data transfer policies to AF 2. After selecting the background data transfer policy 2 from the one or more candidate background data transfer policies, AF 2 stores the background data transfer policy 2 in the UDR network element. Specifically, for the process, refer to FIG. 1. Details are not described again. In this case, PCF 2 and PCF 1 may concurrently formulate background data transfer policies, and after S616 is performed, the procedure ends.

Nevertheless, if PCF 2 does not delay deciding, it needs to be ensured that execution of the background data transfer policy 1 and execution of the background data transfer policy 2 do not affect each other when the background data transfer policy 1 and the background data transfer policy 2 are executed subsequently. For example, one or more of the following cases need to be ensured: the time window of background data transfer policy 1 and the time window of the background data transfer policy 2 do not overlap, a maximum transfer rate used when the background data transfer policy 1 and the background data transfer policy 2 are simultaneously executed in a network crossing area (namely, a same network area) does not exceed a preset threshold that is of a network performance indicator and that is set by the carrier, and the like.

Alternatively, PCF 2 delays deciding, and formulates the background data transfer policy 2 after S618 below. To be specific, PCF 1 and PCF 2 sequentially formulate the background data transfer policies. After PCF 2 formulates the background data transfer policy 2, the procedure ends.

S611: PCF 1 formulates the one or more candidate background data transfer policies based on the decision information 1 and the current network status and according to all the existing background data transfer policies and the carrier policy, and sends an acknowledgment message 1 to the NEF.

The acknowledgment message 1 may be a Npcf_BDTP-Negotiation_Create response, and the acknowledgment message 1 may carry reference Id 1 and the one or more candidate background data transfer policies formulated by PCF 1.

S612: The NEF receives the acknowledgment message 1, and returns a notification message 1 to AF 1.

The notification message 1 may carry reference Id 1 and the one or more candidate background data transfer policies.

S613: AF 1 receives the notification message 1, and if AF 1 determines to select one of the one or more candidate background data transfer policies as the background data transfer policy 1, AF 1 includes reference Id 1 and a policy identifier of the selected background data transfer policy 1 in an update request 1 sent by AF 1 to the NEF; or if AF 1 rejects all candidate background data transfer policies, AF 1 includes a rejection indication in an update request 1 sent by AF 1 to the NEF. The update request 1 may be a Nnef_BDTPNegotiation_Update request.

S614: The NEF receives the update request 1, and sends an update request 1 to PCF 1.

It should be noted that content carried in the update request 1 sent by AF 1 to the NEF may be the same as content carried in the update request 1 sent by the NEF to PCF 1, but message types may be different. The update request 1 sent by the NEF to PCF 1 may be a Npcf_BDT-PolicyControl_Update request.

S615: PCF 1 receives the update request 1, and sends an update request 2 to the UDR network element.

The update request 2 may be a Nudr_DM_Update Request.

For example, PCF 1 may send the update request 2 to the UDR based on the content in the update request 1. For example, if the update request 1 carries reference Id 1 and the policy identifier of the selected background data transfer policy 1, the update request 2 carries reference Id 1 and the selected background data transfer policy 1; if the update request 1 carries the rejection indication, the update request may carry reference Id 1 and a deletion indication, where the deletion indication may indicate to delete the decision information and/or the background data transfer policy that correspond/corresponds to reference Id 1.

S616: The UDR network element receives the update request 2, and returns a response to the update request 2 to PCF 1.

The response to the update request 2 may be a Nudr_DM_Update_response.

Further, when the update request 2 carries reference Id 1 and the new background data transfer policy 1, the UDR network element correspondingly stores reference Id 1 and the new background data transfer policy 1; or when the update request 2 carries reference Id 1 and the deletion indication, the UDR network element deletes the decision information 1 corresponding to reference Id 1 (namely, deletes the stored background data transfer policy 1).

S617: Because PCF 2 has previously subscribed to an event notification of a background data transfer policy change from the UDR network element, the UDR network element sends, to PCF 2, the new background data transfer policy 1 or the indication (namely, the indication for deleting the background data transfer policy 1) for deleting the decision information 1 corresponding to reference Id 1.

For example, the UDR network element may send a Nudr_DM_Notification Request to PCF 2, and the Nudr_DM_Notification Request carries the new background data transfer policy 1 or the indication (namely, the indication for deleting the background data transfer policy 1) for deleting the decision information 1 corresponding to reference Id 1.

S618: PCF 2 receives the new background data transfer policy 1 or the indication (namely, the indication for deleting the background data transfer policy 1) for deleting the decision information 1, and returns a response message to the UDR network element.

S619: PCF 2 formulates the one or more candidate background data transfer policies for AF 2 based on the decision information 2 and the current network status and according to all the existing background data transfer policies (including the background data transfer policy 1) and the carrier policy; or PCF 2 formulates the one or more candidate background data transfer policies for AF 2 based on the decision information 2 and the current network status and according to all the existing background data transfer policies (excluding the background data transfer policy 1) and the carrier policy.

S620: PCF 2 sends an acknowledgment message 2 to the NEF.

The acknowledgment message 2 may be a Npcf_BDTP-Negotiation_Create response, and the acknowledgment message 2 may carry reference Id 2 and the one or more candidate background data transfer policies formulated by PCF 2.

S621: The NEF receives the acknowledgment message 2, and returns a notification message 2 to AF 2.

The notification message 2 may carry reference Id 2 and the one or more candidate background data transfer policies.

S622: AF 2 receives the notification message 2, and if AF 2 determines to select one of the one or more candidate background data transfer policies as the background data transfer policy 2, AF 2 includes reference Id 2 and a policy identifier of the selected background data transfer policy 2 in an update request 3 sent by AF 2 to the NEF; or if AF 2 rejects all candidate background data transfer policies, AF 2 includes a rejection indication in an update request 3 sent by AF 2 to the NEF.

The update request 3 may be a Nnef_BDTPNegotiation_Update request.

S623: The NEF receives the update request 3, and sends an update request 3 to PCF 2.

It should be noted that content carried in the update request 3 sent by AF 2 to the NEF may be the same as content carried in the update request 3 sent by the NEF to PCF 2, but message types may be different. The update request 3 sent by the NEF to PCF 2 may be a Npcf_BDT-PolicyControl_Update request.

S624: PCF 2 receives the update request 3, and sends an update request 4 to the UDR network element.

The update request 4 may be a Nudr_DM_Update Request. For example, if the update request 3 carries reference Id 2 and the selected background data transfer policy 2, the update request 4 carries reference Id 2 and the selected background data transfer policy 2; if the update request 3 carries the rejection indication, the update request 4 carries reference Id 2 and a deletion indication, where the deletion indication may indicate to delete the decision information 2 and/or the background data transfer policy 2 that correspond/corresponds to reference Id 2.

S625: The UDR network element receives the update request 4, and returns a response to the update request 4 to PCF 2.

The response to the update request 4 may be a Nudr_DM_Update_response.

Further, when the update request 4 carries reference Id 2 and the new background data transfer policy 2, the UDR network element correspondingly stores reference Id 2 and the background data transfer policy 2. When the update request 4 carries reference Id 2 and the deletion indication, the UDR deletes the decision information 2 (namely, deletes the stored background data transfer policy 2).

Based on the method shown in FIG. 6A and FIG. 6B, when formulating background data transfer policies, a plurality of PCFs not only refer to existing background data transfer policies, but also refer to decision information required for formulating a background data transfer policy by another PCF. This avoids a conflict with formulation performed by the another PCF, and ensures availability of the background data transfer policies.

Figure 7A:
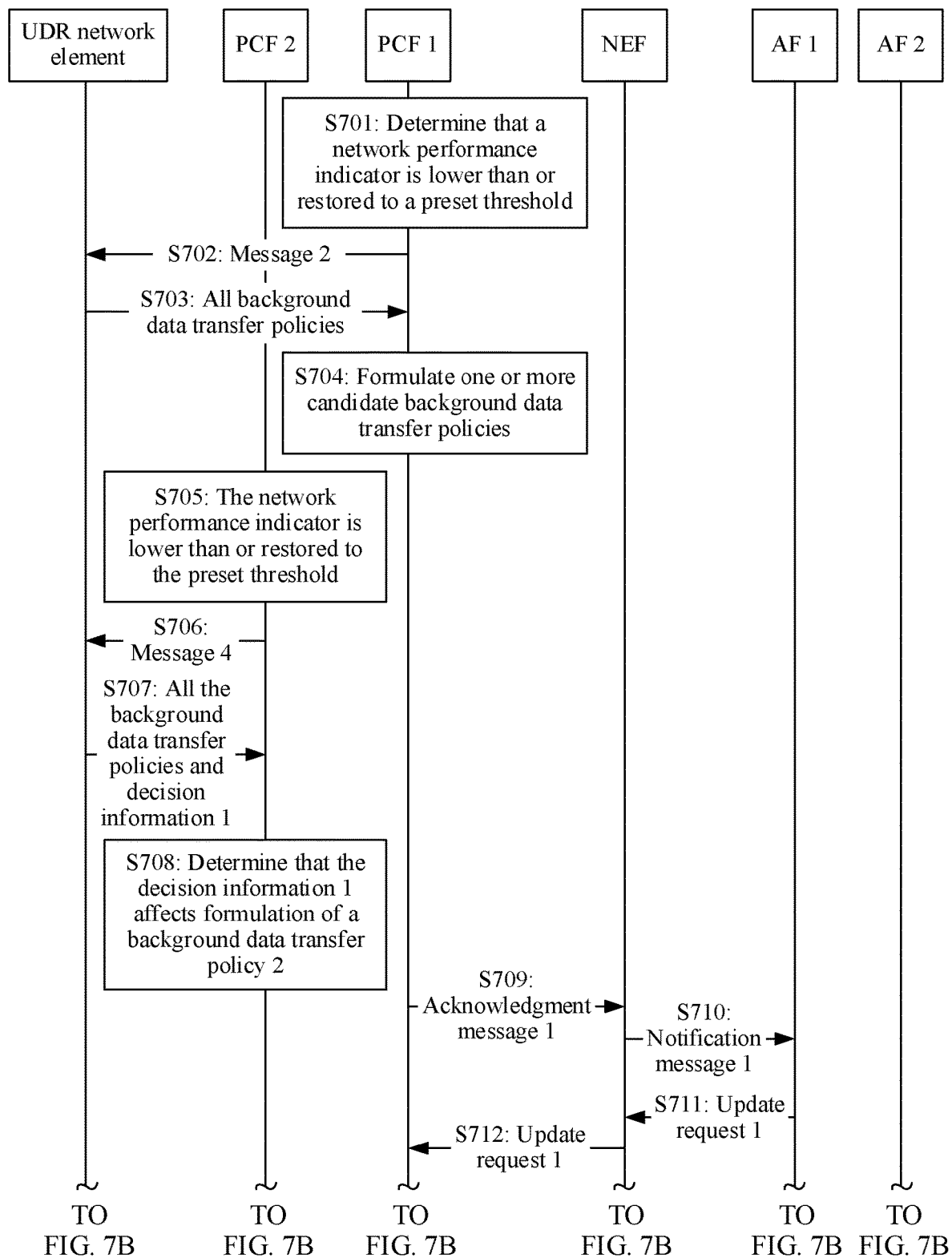
FIG. 7A and FIG. 7B are a flowchart of a background data transfer policy formulation method according to an embodiment of this application.
Figure 7B:
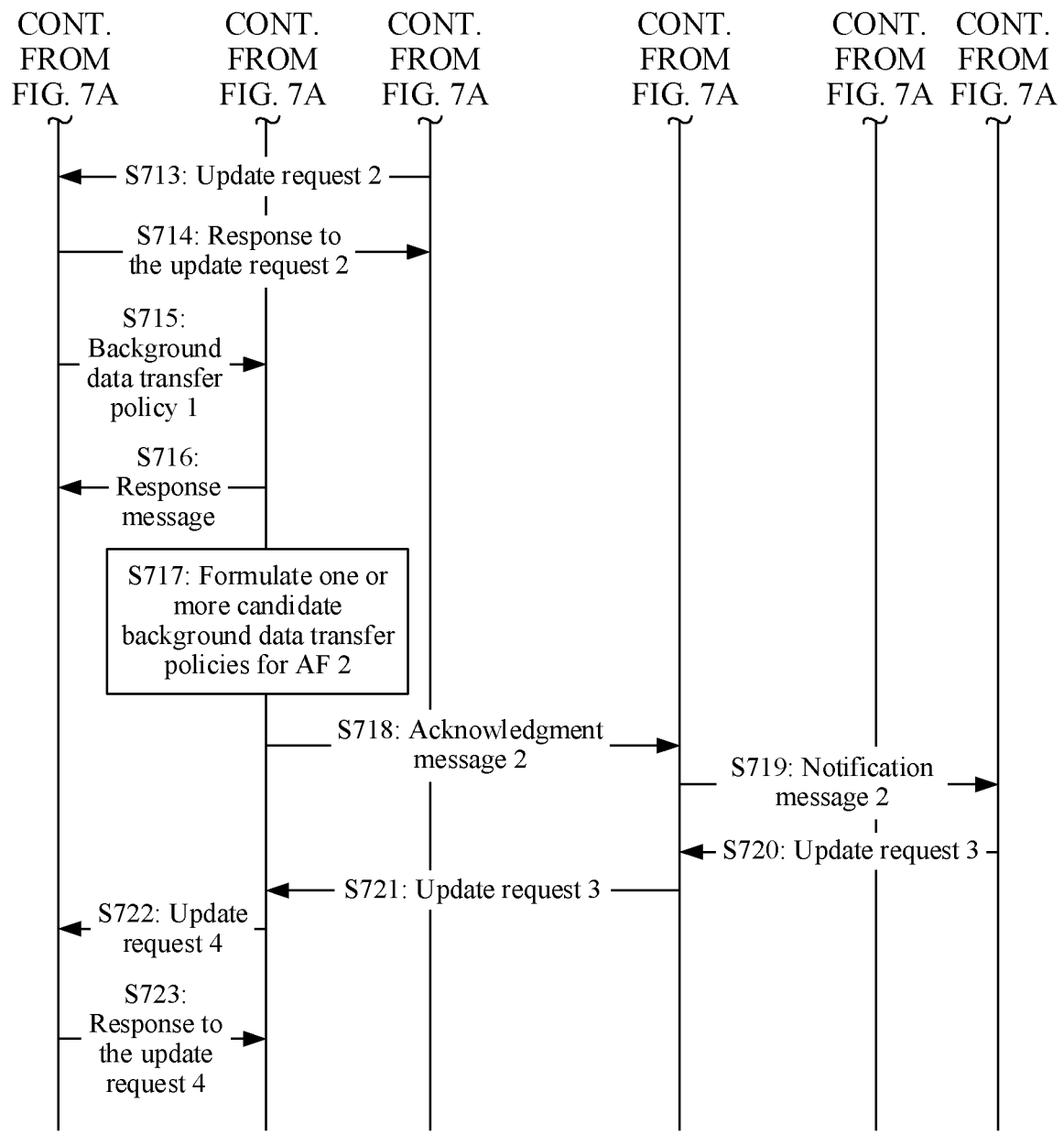

In the method shown in FIG. 6A and FIG. 6B, an example in which an AF requests to formulate a background data transfer policy is used for description. Alternatively, when a network performance indicator is lower than or restored to a preset threshold, a PCF may be triggered to perform the process in this embodiment of this application. The process is shown in FIG. 7A and FIG. 7B. FIG. 7A and FIG. 7B are a flowchart of a background data transfer policy formulation method according to an embodiment of this application. As shown in FIG. 7A and FIG. 7B, the method may include the following steps.

S701: PCF 1 determines that a network performance indicator is lower than or restored to a preset threshold.

The preset threshold may be set based on a requirement, and is not limited. For example, after a transfer window is allocated, if a network changes, network load in such a time period becomes congested, and a charge rate correspondingly becomes high. Consequently, a user transfer charge rate is high, and a requirement of a user on performing network transfer by using a lowest charge cannot be met, that is, the network performance indicator is lower than the preset threshold.

For example, PCF 1 may determine whether the network performance indicator is lower than or restored to the preset threshold. Alternatively, PCF 1 may learn, from another network element, whether the network performance indicator is lower than or restored to the preset threshold. For example, PCF 1 sends a subscription request to an NWDAF, where the subscription request is used to obtain a network performance indicator event, and the network performance indicator event is an event that a network performance indicator in a time window of a formulated background data transfer policy (for example, a background data transfer policy 3 formulated based on decision information 1) is lower than or restored to the preset threshold, and PCF 1 receives the network performance indicator event notified by the NWDAF.

In this case, PCF 1 has formulated the background data transfer policy 3 corresponding to reference Id 1, and stores the background data transfer policy 3 and the decision information 1 in a UDR.

S702: PCF 1 sends a message 2 to the UDR network element.

The message 2 may be a data management_query request (Nudr_DM_query request) provided by a Nudr interface. The message 2 is used to request all background data transfer policies stored in the UDR network element. The message 2 may carry the reference identifier reference Id 1 allocated by PCF 1 to a background data transfer policy 1 and the received decision information 1.

This application is not limited to including reference Id 1 and the decision information 1 in the message 2 and sending the message 2 to the UDR. Alternatively, PCF 1 may send reference Id 1 and the decision information 1 to the UDR based on another message. In this case, PCF 1 first sends the message 2 to the UDR to request the background data transfer policies stored in the UDR. The UDR sends, to PCF 1, the stored background data transfer policies and corresponding decision information that include the background data transfer policy 3 and the decision information 1 used to decide the background data transfer policy 3 (also used to decide the background data transfer policy 1) (in this case, the decision information 1 does not include an indication that the background data transfer policy 1 is being negotiated or a reason for formulating the background data transfer policy 1). After PCF 1 determines to re-formulate the background data transfer policy 1, PCF 1 sends updated decision information 1 to the UDR based on another message.

In addition to one or more of information such as a quantity of first terminals, a first time window, information about a first network area, first traffic generated when each terminal transfers background data, or the reason for formulating the background data transfer policy 1 (where the information may be locally stored in PCF 1 or obtained from the UDR), the decision information 1 sent by PCF 1 to the UDR may further include an indication that the background data transfer policy is being formulated (in other words, being negotiated). For example, PCF 1 may use a special information element to carry the decision information 1 to indicate that the background data transfer policy corresponding to reference Id 1 is being negotiated, include a special identifier in the decision information 1 to indicate that the background data transfer policy corresponding to reference Id 1 is being negotiated, or use the reason for formulating the background data transfer policy in the decision information 1 to indicate that the background data transfer policy corresponding to reference Id 1 is being negotiated.

S703: The UDR network element receives the message 2, and returns, to PCF 1, all the background data transfer policies stored in the UDR network element.

Further, the UDR network element correspondingly stores the decision information 1 and reference Id 1.

It should be noted that, in this case, if the UDR network element stores decision information required for formulating a background data transfer policy by another PCF, the UDR network element further returns the decision information stored in the UDR network element.

S704: PCF 1 receives all the background data transfer policies stored in the UDR network element, and formulates one or more candidate background data transfer policies according to a carrier policy and all the background data transfer policies stored in the UDR network element and based on a current network status and the like.

The candidate background data transfer policy is a background data transfer policy that may be selected by AF 1 as the background data transfer policy 1. A candidate background data transfer policy may include one or more of information such as a policy identifier, a recommended transfer time window, a maximum aggregate bit rate, and a rating group identifier.

For example, for a process in which PCF 1 formulates the one or more candidate background data transfer policies according to the carrier policy and all the background data transfer policies stored in the UDR network element and based on the current network status and the like, refer to a conventional technology. Details are not described.

Further, after formulating the one or more candidate background data transfer policies, PCF 1 performs S106 to S113 shown in FIG. 1. In a process in which PCF 1 performs S106 to S113, another PCF may also formulate a background data transfer policy. For example, PCF 2 also formulates a background data transfer policy. That is, two or more PCFs simultaneously formulate background data transfer policies. Specifically, the process is shown in the following steps.

S705: PCF 2 determines that the network performance indicator is lower than or restored to the preset threshold.

In this case, PCF 2 has formulated a background data transfer policy 4 corresponding to reference Id 2, and stores the background data transfer policy 4 and decision information 2 in the UDR.

For S705, refer to S701. Details are not described again.

It should be noted that S705 may be replaced with a process in which AF 2 requests PCF 2 to formulate a background data transfer policy, for example, may be replaced with the foregoing S606 and S607.

S706: PCF 2 sends a message 4 to the UDR network element.

S707: The UDR network element receives the message 4, and returns, to PCF 2, all the existing background data transfer policies and the decision information 1 that is received in S703.

The UDR uses the special information element to carry the decision information 1 to indicate that the background data transfer policy corresponding to reference Id 1 is being negotiated, include the special identifier in the decision information 1 to indicate that the background data transfer policy corresponding to reference Id 1 is being negotiated, or use the reason for formulating the background data transfer policy 1 in the decision information 1 to indicate that the background data transfer policy corresponding to reference Id 1 is being negotiated.

S708: PCF 2 determines that the decision information 1 affects formulation of a background data transfer policy 2.

Further, PCF 2 does not delay formulation of the background data transfer policy 2, but formulates the background data transfer policy 2 based on the decision information 2 and the decision information 1 and according to all the existing background data transfer policies. However, execution of the background data transfer policy 1 and execution of the background data transfer policy 2 do not affect each other, for example, a time window of the background data transfer policy 1 and a time window of the background data transfer policy 2 are set to be non-overlapping, and/or a maximum transfer rate used when the background data transfer policy 1 and the background data transfer policy 2 are simultaneously executed in a network intersection area (for example, a same area) does not exceed the preset threshold that is of the network performance indicator and that is set by a carrier.

Alternatively, PCF 2 delays deciding. For example, after obtaining the background data transfer policy 1 in subsequent S715, PCF 2 formulates the background data transfer policy 2 based on the decision information 2 and according to all the background data transfer policies stored in the UDR network element and the background data transfer policy 1. As described below, after receiving the background data transfer policy 1 from the UDR network element, PCF 2 may formulate the background data transfer policy 2 based on the decision information 2 and according to all the background data transfer policies stored in the UDR network element and the background data transfer policy 1.

Alternatively, PCF 2 delays deciding. After subsequently obtaining, in S715, an indication sent by the UDR for deleting the decision information 1, PCF 2 formulates the background data transfer policy 2 based on the decision information 2 and according to all the background data transfer policies stored in the UDR. For example, in the following process of performing S709 to S714, PCF 1 fails to negotiate the background data transfer policy 1 with a third-party application server, and PCF 1 sends an indication (namely, an indication for deleting the background data transfer policy 1) for deleting the decision information 1 to the UDR, to indicate the UDR to delete the decision information 1, and the UDR indicates PCF 2 to delete the decision information 1. After receiving the indication from the UDR, PCF 2 formulates the background data transfer policy 2 based on the decision information 2 and according to all the background data transfer policies stored in the UDR.

S709: PCF 1 formulates the one or more candidate background data transfer policies based on the decision information 1 and the current network status and according to all the existing background data transfer policies and the carrier policy, and sends an acknowledgment message 1 to an NEF.

The decision information 1 is obtained by PCF 1 from the UDR, or may be locally stored by PCF 1 when AF 1 requests the background data transfer policy from PCF 1.

S710: The NEF receives the acknowledgment message 1, and returns a notification message 1 to AF 1.

S711: AF 1 receives the notification message 1, and if AF 1 determines to select one of the one or more candidate background data transfer policies as the background data transfer policy 1, AF 1 includes reference Id 1 and a policy identifier of the selected background data transfer policy 1 in an update request 1 sent by AF 1 to the NEF; or if AF 1 rejects all candidate background data transfer policies, AF 1 includes a rejection indication in an update request 1 sent by AF 1 to the NEF.

S712: The NEF receives the update request 1, and sends an update request 1 to PCF 1.

S713: PCF 1 receives the update request 1, and sends an update request 2 to the UDR network element.

The update request 2 may be a Nudr_DM_Update Request.

For example, PCF 1 may send the update request 2 to the UDR based on content in the update request 1. For example, if the update request 1 carries reference Id 1 and the policy identifier of the selected background data transfer policy 1, the update request 2 carries reference Id 1 and the selected background data transfer policy 1; if the update request 1 carries the rejection indication, the update request may carry reference Id 1 and a deletion indication, where the deletion indication may indicate to delete the decision information and/or the background data transfer policy that correspond/corresponds to reference Id 1.

S714: The UDR network element receives the update request 2, and returns a response to the update request 2 to PCF 1.

Further, when the update request 2 carries reference Id 1 and the new background data transfer policy 1, the UDR network element updates the background data transfer policy 3 corresponding to reference Id 1 to the background data transfer policy 1. In addition, the UDR deletes, from the decision information 1, the indication that the background data transfer policy is being formulated or the reason for formulating the background data transfer policy. Alternatively, when the update request 2 carries reference Id 1 and the deletion indication, the UDR deletes the decision information 1 and/or the background data transfer policy 3 that correspond/corresponds to reference Id 1.

S715: Because PCF 2 has previously subscribed to an event notification of a background data transfer policy change from the UDR network element, the UDR network element sends the background data transfer policy 1 or sends reference Id 1 and the deletion indication to PCF 2.

S716: PCF 2 receives the background data transfer policy 1 or reference Id 1 and the deletion indication, and returns a response message to the UDR network element.

S717: PCF 2 formulates one or more candidate background data transfer policies for AF 2 based on the decision information 2 and the current network status and according to all the existing background data transfer policies (including the background data transfer policy 1) and the carrier policy; or PCF 2 formulates one or more candidate background data transfer policies for AF 2 based on the decision information 2 and the current network status and according to all the existing background data transfer policies (excluding the background data transfer policy 3) and the carrier policy.

S718: PCF 2 sends an acknowledgment message 2 to the NEF.

S719: The NEF receives the acknowledgment message 2, and returns a notification message 2 to AF 2.

The notification message may carry reference Id 2 and the one or more candidate background data transfer policies.

S720: AF 2 receives the notification message 2, selects one of the one or more candidate background data transfer policies as the background data transfer policy 2, and sends an update request 3 to the NEF.

S721: The NEF receives the update request 3, and sends an update request 3 to PCF 2.

S722: PCF 2 receives the update request 3, and sends an update request 4 to the UDR network element.

The update request 4 may be a Nudr_DM_Update Request. For example, if the update request 3 carries reference Id 2 and the selected background data transfer policy 2, the update request 4 carries reference Id 2 and the selected background data transfer policy 2; if the update request 3 carries a rejection indication, the update request 4 carries reference Id 2 and a deletion indication, where the deletion indication may indicate to delete the decision information 2 and/or the background data transfer policy 2 that correspond/corresponds to reference Id 2.

S723: The UDR network element receives the update request 4, and returns a response to the update request 4 to PCF 2.

Further, when the update request 4 carries reference Id 2 and the background data transfer policy 2, the UDR network element updates the background data transfer policy 4 corresponding to reference Id 2 to the background data transfer policy 2. In addition, the UDR deletes, from the decision information 2, an indication that the background data transfer policy is being formulated or a reason for formulating the background data transfer policy. Alternatively, when the update request 2 carries reference Id 2 and the deletion indication, the UDR deletes the decision information 2 and/or the stored background data transfer policy 4 that correspond/corresponds to reference Id 2.

For a process of performing S706 to S723, refer to S608 to S625. Details are not described again.

Based on the method shown in FIG. 7A and FIG. 7B, a plurality of PCFs may re-formulate background data transfer policies when a network performance indicator is low or is restored to a normal value. When formulating the background data transfer policies, the plurality of PCFs not only refer to existing background data transfer policies, but also refer to decision information required for formulating a background data transfer policy by another PCF, so as to avoid a conflict between the background data transfer policies formulated by the plurality of PCFs and the background data transfer policy formulated by the another PCF, thereby ensuring availability of the background data transfer policies.

It should be noted that the method shown in FIG. 6A and FIG. 6B or FIG. 7A and FIG. 7B may be applied to the 5G communication system shown in FIG. 3a. Similarly, the method shown in FIG. 6A and FIG. 6B or FIG. 7A and FIG. 7B may be further applied to the 4G communication system shown in FIG. 3b. For example, after the PCF in the method shown in FIG. 6A and FIG. 6B or FIG. 7A and FIG. 7B is replaced with a PCRF, the UDR network element in the method shown in FIG. 6A and FIG. 6B or FIG. 7A and FIG. 7B is replaced with an SPR, and the NEF in the method shown in FIG. 6A and FIG. 6B or FIG. 7A and FIG. 7B is replaced with an SCEF, the method shown in FIG. 6A and FIG. 6B or FIG. 7A and FIG. 7B may be applied to the 4G communication system shown in FIG. 3b.

The foregoing mainly describes the solutions provided in embodiments of this application from a perspective of interaction between nodes. It may be understood that, to implement the foregoing functions, each node, for example, the first policy control network element, includes a corresponding hardware structure and/or software module for performing each function. A person skilled in the art should be easily aware that algorithm steps in examples described with reference to embodiments disclosed in this specification can be implemented in a form of hardware, software, or a combination of hardware and computer software in the methods in embodiments of this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, the first policy control network element may be divided into functional modules based on the foregoing method examples. For example, each functional module may be obtained through division based on each corresponding function, or two or more functions may be integrated into one processing module. The integrated module may be implemented in a form of hardware, or may be implemented in a form of a software functional module. It should be noted that, in embodiments of this application, module division is an example, and is merely a logical function division. In actual implementation, another division manner may be used.

Figure 8:
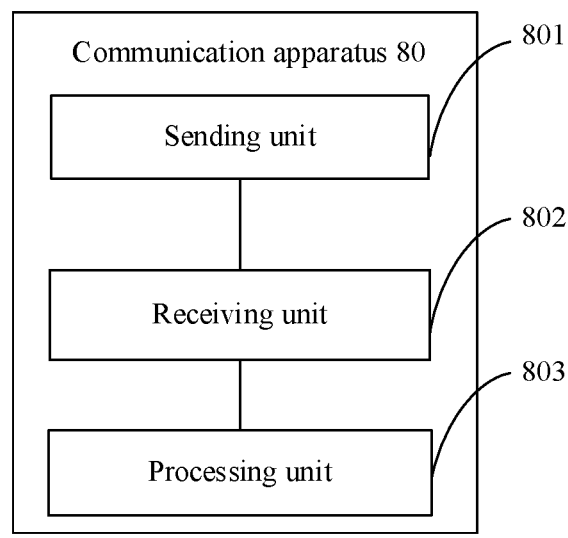
FIG. 8 is a schematic composition diagram of a communication apparatus 80 according to an embodiment of this application.

FIG. 8 is a diagram of a structure of a communication apparatus 80. The communication apparatus 80 may be a first policy control network element, a chip, a system-on-a-chip, or another apparatus that can implement a function of the first policy control network element in the foregoing methods and that is in the first policy control network element, or the like. The communication apparatus 80 may be configured to perform the function of the first policy control network element in the foregoing method embodiments. In a possible implementation, the communication apparatus 80 shown in FIG. 8 includes a sending unit 801, a receiving unit 802, and a processing unit 803.

The sending unit 801 is configured to send a first message to a first network element, where the first message is used to request a background data transfer policy stored in the first network element. For example, the sending unit 801 is configured to support the communication apparatus 80 in performing S501, S608, and S706.

The receiving unit 802 is configured to obtain, from the first network element, the background data transfer policy stored in the first network element and second decision information, where the second decision information is used to formulate a second background data transfer policy. For example, the receiving unit 802 is configured to support the communication apparatus 80 in performing S502, S609, and S707.

The processing unit 803 is configured to formulate a first background data transfer policy based on first decision information and the second decision information and according to the background data transfer policy stored in the first network element, where the first decision information is information used to formulate the first background data transfer policy. For example, the processing unit 803 is configured to support the communication apparatus in performing S503, S619, and S717.

In a possible implementation, the processing unit 803 is specifically configured to: when the second decision information affects decision/formulation of the first background data transfer policy, not delay formulation of the first background data transfer policy, and formulate the first background data transfer policy based on the first decision information and the second decision information and according to the background data transfer policy stored in the first network element, where execution of the first background data transfer policy and execution of the second background data transfer policy do not affect each other.

In still another possible implementation, the processing unit 803 is specifically configured to: when the second decision information affects decision/formulation of the first background data transfer policy, delay formulation of the first background data transfer policy until, for example, the second background data transfer policy is obtained, and then formulate the first background data transfer policy based on the first decision information and according to the second background data transfer policy and the background data transfer policy stored in the first network element.

Optionally, before the sending unit 801 sends the first message to the first network element, the receiving unit 802 is further configured to receive the first decision information from the first application server. For example, the receiving unit 802 receives a second message from the first application server, where the second message includes the first decision information, and the second message is used to request to formulate the first background data transfer policy.

In a possible implementation, the sending unit 801 is specifically configured to send the first message to the first network element based on the second message. For example, the second message is a trigger condition for sending the first message by the sending unit 801. Once the receiving unit 802 receives the second message, the sending unit 801 sends the first message to the first network element.

In another possible design, the sending unit 801 is specifically configured to: when a network performance indicator is lower than or restored to a preset threshold, send the first message to the first network element, where the network performance indicator may be a performance indicator used when a network transfers background data according to a third background data transfer policy, and the third background data transfer policy may be a background data transfer policy formulated based on the first decision information before the first background data transfer policy is formulated.

Further, the first message may include a first reference identifier and the first decision information, so that the first network element correspondingly stores the first reference identifier and the first decision information, and provides the first decision information for another policy control network element when the another policy control network element formulates a background data transfer policy, thereby avoiding a conflict between the background data transfer policy formulated by the another policy control network element and the background data transfer policy corresponding to the first decision information.

Specifically, all related content of the steps in the foregoing method embodiments shown in FIG. 5 to FIG. 7A and FIG. 7B may be cited in function descriptions of the corresponding functional modules. Details are not described herein again. The communication apparatus 80 is configured to perform a function of the first policy control network element in the background data transfer policy formulation methods shown in FIG. 5 to FIG. 7A and FIG. 7B, and therefore can achieve a same effect as that in the foregoing background data transfer policy formulation methods.

In this embodiment, the communication apparatus 80 may further be presented in a form of functional modules obtained through division in an integrated manner. The "functional module" herein may be an application-specific integrated circuit (ASIC), a circuit, a processor and a memory that execute one or more software or firmware programs, an integrated logic circuit, and/or another component that can provide the foregoing functions. In a simple embodiment, a person skilled in the art may figure out that the communication apparatus 80 may be in a form of the communication apparatus 400 shown in FIG. 4.

For example, the processor 401 in the communication apparatus 400 shown in FIG. 4 may invoke computer-executable instructions stored in the memory 404, so that the communication apparatus 400 performs the background data transfer policy formulation methods in the foregoing method embodiments.

Specifically, functions/implementation processes of the sending unit 801 and the receiving unit 802 in FIG. 8 may be implemented by the processor 401 in the communication apparatus 400 shown in FIG. 4 by invoking the computer-executable instructions stored in the memory 404. Functions/implementation processes of the sending unit 801 and the receiving unit 802 in FIG. 8 may be implemented via the communication interface 403 in the communication apparatus 400 shown in FIG. 4. Functions/implementation processes of the processing unit 803 in FIG. 8 may be implemented via the processor 401 in the communication apparatus 400 shown in FIG. 4.

The foregoing embodiment describes a solution of how to avoid a conflict between formulated background data transfer policies of different PCFs in a process in which a PCF triggers a PCF to re-formulate (in other words, renegotiate) a background data transfer policy when a network performance indicator is lower than or restored to a preset threshold or in a process in which an application server triggers a PCF to formulate a background data transfer policy when a network performance indicator is lower than or restored to a preset threshold. In a process in which a PCF formulates a background data transfer policy, in addition to a conflict between background data transfer policies formulated by different PCFs, whether the background data transfer policy being formulated (in other words, being negotiated) by the PCF affects formulation of another policy of UE, for example, affects formulation of a UE policy or a UE session management policy of the UE, also needs to be considered.

Figure 9:
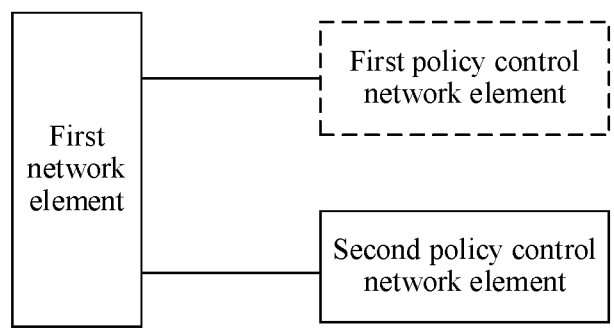
FIG. 9 is a schematic diagram of an architecture of still another communication system according to an embodiment of this application.

To avoid impact of the background data transfer policy that is being formulated (in other words, being negotiated) by the PCF on formulation of the another policy of the UE, for example, the session management policy of the session of the UE, this application further provides a session management solution shown in FIG. 9.

The following describes the session management solution provided in an embodiment of this application with reference to the accompanying drawings in this specification.

A session management method provided in this embodiment of this application may be applied to a network shown in FIG. 9. FIG. 9 shows a communication system 10 according to an embodiment of this application. The communication system 10 includes a second policy control network element and a first network element.

In a first implementation,
a second policy control network element may be configured to formulate a policy and charging control (PCC) rule such as a background data transfer policy, a quality of service policy, and a slice selection policy, and provide the formulated policy for network elements such as a mobility management network element and a session management network element.

The first network element may be referred to as a network repository network element, and is configured to store user data, for example, subscription information, authentication data, or authorization data of a user. Specifically, the network repository network element may be a UDM network element, an NRF network element, a UDR network element, or the like.

In an example, the second policy control network element is configured to: receive a policy association establishment request corresponding to a request for establishing a session of user equipment UE, and send, to the first network element, a fourth message used to request a first background data transfer policy applied to the session.

The first network element is configured to: receive the fourth message, and send first decision information to the second policy control network element.

The second policy control network element is further configured to: obtain, from the first network element, the first decision information corresponding to the first background data transfer policy, and manage the session based on the first decision information.

In a possible design, that the second policy control network element manages the session based on the first decision information includes:
the second policy control network element is specifically configured to: reject the policy association establishment request based on the first decision information, or accept the policy association establishment request based on the first decision information.

Further, when the second policy control network element accepts the policy association establishment request based on the first decision information, the second policy control network element is further configured to: after receiving the first background data transfer policy that corresponds to the first decision information and that is sent by the first network element, formulate, according to the first background data transfer policy, a session management policy that is of the session and that is used to perform policy and charging control on the session, and send the session management policy of the session to the session management network element.

In a possible design, the second policy control network element is further configured to terminate a policy association according to the first background data transfer policy after receiving the first background data transfer policy sent by the first network element.

In a possible design, the second policy control network element is further configured to terminate the policy association after receiving a deletion indication corresponding to the first decision information.

In a second implementation, a second policy control network element is configured to: receive a policy association establishment request corresponding to a registration request of user equipment, and send, to the first network element, a fourth message used to request a first background data transfer policy applied to the UE.

The first network element is configured to: receive the fourth message, and send first decision information to the second policy control network element.

The second policy control network element is further configured to: obtain, from the first network element, the first decision information corresponding to the first background data transfer policy, and formulate a UE policy of the UE based on the first decision information.

That the second policy control network element formulates a UE policy of the UE based on the first decision information may include:

the second policy control network element is specifically configured to: delay formulation of the UE policy of the UE, and after obtaining the first background data transfer policy corresponding to the first decision information, formulate the UE policy of the UE according to the first background data transfer policy.

In a possible design, the second policy control network element is further configured to send a policy association establishment response, where the policy association establishment response does not carry the UE policy of the UE.

It should be noted that FIG. 9 is merely an example diagram of an architecture. In addition to functional units shown in FIG. 9, the system may further include another functional network element, for example, a first policy control network element. This is not limited in this embodiment of this application. In addition, names of the devices in FIG. 9 are not limited. In addition to the names shown in FIG. 9, the devices may also have other names. For example, the names are replaced with names of network elements having same or similar functions. This is not limited.

The first policy control network element is configured to send the first decision information to the first network element.

The communication system shown in FIG. 9 may be a 3rd generation partnership project (3GPP) communication system, for example, may be a 4th generation (4G) communication system shown in FIG. 3*b* or a long term evolution (LTE) system, or may be a 5th generation (5G) communication system shown in FIG. 3*a*, a new radio (NR) system, or a next-generation communication system, or may be a non-3GPP communication system. This is not limited.

Optionally, the second policy control network element in embodiments of this application may also be referred to as a communication apparatus, and may be a general-purpose device or a dedicated device. This is not specifically limited in embodiments of this application.

Optionally, a related function of the second policy control network element in embodiments of this application may be implemented by one device, may be jointly implemented by a plurality of devices, or may be implemented by one or more functional modules in one device. This is not specifically limited in embodiments of this application. It may be understood that the foregoing function may be a network element in a hardware device, may be a software function running on dedicated hardware, a combination of hardware and software, or a virtualization function instantiated on a platform (for example, a cloud platform).

During specific implementation, each device (for example, the second policy control network element) shown in FIG. 9 may use a composition structure shown in FIG. 4, or include components shown in FIG. 4.

The following describes, with reference to the communication system shown in FIG. 9, the session management method provided in embodiments of this application. Network elements in the following embodiments may have components shown in FIG. 4. Details are not described again. It should be noted that names of messages exchanged between devices, names of parameters in the messages, or the like in embodiments of this application are merely examples, and other names may also be used in specific implementation. For example, formulation described in embodiments of this application may be replaced with terms such as decision-making and negotiation. "Determine" in embodiments of this application may also be understood as "create" or "generate". "Include" in embodiments of this application may also be understood as "carry". "Formulate" in embodiments of this application may also be understood as "decide", "determine", or the like. This is uniformly described herein. This is not specifically limited in embodiments of this application.

Figure 10:
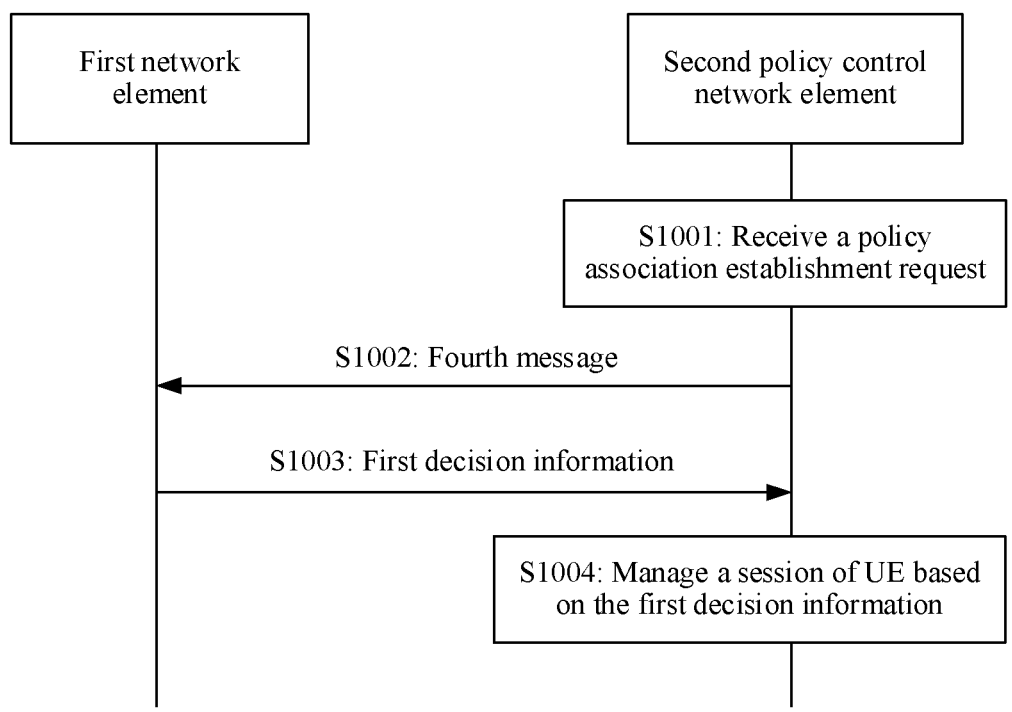
FIG. 10 is a flowchart of a session management method according to an embodiment of this application.

FIG. 10 shows a session management method according to an embodiment of this application. The method may include the following steps.

S1001: A second policy control network element receives a policy association establishment request.

The second policy control network element may be any policy control network element in the communication system shown in FIG. 2*a*.

The policy association establishment request may correspond to an establishment request for a session of user equipment (UE). The policy association establishment request may be replaced with a session management policy association establishment request, to request to establish a session management policy of the session of the UE. The session management policy of the session of the UE is used to perform policy and charging control on the session. The session management policy may include at least a policy and charging control rule, and may be used to specify a related performance parameter of a PDU session that is established by the UE and that is used to transfer background data, for example, specify a quality of service (QoS) parameter and a maximum rate of the PDU session.

The establishment request for the session of the UE is used to request to establish the session of the UE. For example, in a 5G communication system, the establishment request for the session of the UE may be an establishment request for a protocol data unit (PDU) session of the UE, and the session of the UE may be the PDU session of the UE.

For example, the second policy control network element may receive a policy association establishment request from a session management network element (such as an SMF).

S1002: The second policy control network element sends a fourth message to a first network element. Correspondingly, the first network element receives the fourth message.

The first network element may be a UDR network element, a UDM network element, an NRF network element, another network element that can store a background data transfer policy, or the like. For related descriptions of the first network element, refer to the descriptions in S501. Details are not described again.

The fourth message may be used to request a background data transfer policy that corresponds to a first reference identifier, that is applied to the UE, and that is stored in the first network element. The background data transfer policy corresponding to the first reference identifier may be a background data transfer policy that needs to be obtained for formulating a first policy. In other words, the background data transfer policy corresponding to the first reference identifier is associated with formulation of the first policy, and it is possible that the background data transfer policy corresponding to the first reference identifier needs to be referenced when the first policy is formulated. Previously, a first policy control network element negotiates with a first application server according to the foregoing embodiments, formulates, based on first decision information, a third background data transfer policy corresponding to the first reference identifier, and stores the third background data transfer policy in the first network element. Subsequently, due to reasons described in the foregoing embodiments, the first policy control network element determines to re-formulate the background data transfer policy (namely, a first background data transfer policy) corresponding to the first reference identifier. The first background data transfer policy is a background data transfer policy of which formulation is not completed or that is being formulated (in other words, being negotiated), and the third background data transfer policy is an invalid background data transfer policy.

For example, the fourth message may include the first reference identifier, the first reference identifier may identify the first background data transfer policy and the third background data transfer policy, the third background data transfer policy is an old background data transfer policy, and the first background data transfer policy may be a newly formulated background data transfer policy. The first reference identifier may also identify the first decision information corresponding to the first background data transfer policy.

S1003: The first network element sends the first decision information to the second policy control network element based on the fourth message. Correspondingly, the second policy control network element obtains the first decision information from the first network element.

The first decision information may include one or more of information such as a quantity of first terminals, a first time window, information about a first network area, first traffic generated when each terminal transfers background data, an indication that the first background data transfer policy is being negotiated, or a reason for formulating the first background data transfer policy. The first network element may use a special information element to carry the first decision information to indicate that the background data transfer policy is being formulated (in other words, being negotiated), include a special identifier in the first decision information to indicate the background data transfer policy is being formulated (in other words, being negotiated), or use the reason for formulating the background data transfer policy in the first decision information to indicate that the background data transfer policy is being formulated (in other words, being negotiated). For example, for a process in which the first network element sends, to the second policy control network element, the first decision information stored in the first network element, refer to the descriptions in S502. Details are not described again.

S1004: The second policy control network element manages the session of the UE based on the first decision information.

For example, the second policy control network element may determine whether the first decision information affects formulation of the session management policy of the UE. If the first decision information does not affect formulation of the session management policy of the UE, the second policy control network element may manage the session of the UE in an existing manner. If the first decision information affects formulation of the session management policy of the UE, the second policy control network element may manage the session of the UE in the following Manner 1 or Manner 2. That the first decision information affects formulation of the session management policy of the UE may include one or more of the following cases: For example, it is determined, according to a network policy configured by a carrier, that the first background data transfer policy is not considered.

Manner 1: The second policy control network element rejects the policy association establishment request based on the first decision information, and stops formulation of the session management policy of the UE.

Manner 2: The second policy control network element accepts the policy association establishment request based on the first decision information.

Further, in Manner 2, the second policy control network element delays formulation of the first policy until the second policy control network element obtains the first background data transfer policy corresponding to the first decision information, and then the second policy control network element formulates the session management policy of the session of the UE according to the first background data transfer policy, and sends the session management policy of the session to the session management network element, to trigger the session management network element to establish the session of the UE.

Alternatively, further, in Manner 2, after formulation of the first background data transfer policy is completed and the second policy control network element obtains the first background data transfer policy, if the first background data transfer policy conflicts with the session of the UE, the second policy control network element terminates a policy association according to the first background data transfer policy.

Alternatively, further, in Manner 2, if negotiation on the first background data transfer policy fails, for example, the first application server rejects the background data transfer policy generated by the first policy control network element, and sends a rejection indication to the first policy control network element, the first policy control network element sends the first reference identifier and a deletion indication to the first network element, the first network element sends the first reference identifier and the deletion indication to the second policy control network element, and the second policy control network element terminates a policy association after receiving the deletion indication.

In this embodiment of this application, that the second policy control network element terminates a policy association may mean: The second policy control network element sends a termination request message to the session management network element, where the termination request message indicates to terminate the policy association.

It should be noted that, when the second policy control network element obtains the first background data transfer policy or the deletion indication from the first network element, the method further includes: The second policy control network element subscribes to a first event from the first network element, where the first event is an event notification indicating that the background data transfer policy stored in the first network element/decision information changes, so that when the stored background data transfer policy changes, the first network element notifies the second policy control network element of the changed background data transfer policy, notifies the second policy control network element of all background data transfer policies in the first network element that are after the change, or notifies the second policy control network element of a change of the decision information. A change of a background data transfer policy may include adding a background data transfer policy, deleting a background data transfer policy, updating a background data transfer policy, or the like. A change of decision information may include deleting decision information, updating content included in decision information, adding new decision information, or the like.

Based on the method shown in FIG. 10, when formulating the session management policy of the session of the UE, the policy control network element may obtain, from the first network element, decision information required for formulating another policy of the UE, and manage the session based on the obtained decision information, so as to avoid a conflict between the formulated background data transfer policy corresponding to the decision information and the session management policy of the session of the UE, and ensure availability of the background data transfer policy and the another policy of the UE.

In addition to managing the session of the UE based on the decision information, the second policy control network element may further formulate, based on the decision information, a policy, for example, the UE policy, of the UE other than the background data transfer policy, to avoid a background data transfer failure caused by a conflict between the policy of the UE other than the background data transfer policy and the background data transfer policy. For example, the UE policy of the UE is formulated based on the decision information. For a method for formulating the UE policy of the UE by the second policy control network element based on the decision information, refer to FIG. 10. The method may include the following (1) to (4).

(1) The second policy control network element receives a policy association establishment request corresponding to a registration request of the user equipment.

The policy association establishment request corresponding to the registration request of the user equipment may be a UE policy association establishment request, and is used to request to establish the UE policy. The UE policy may indicate the UE to establish the PDU session used to transfer the background data.

The registration request may request to register with a network.

For example, the second policy control network element may receive, from the session management network element, the policy association establishment request corresponding to the registration request of the user equipment.

(2) The second policy control network element sends, to the first network element, the fourth message used to request the first background data transfer policy applied to the UE. This step is the same as S1002, and details are not described again.

(3) The second policy control network element obtains, from the first network element, the first decision information that corresponds to the first background data transfer policy. This step is the same as S1003, and details are not described again.

(4) The second policy control network element formulates the UE policy of the UE based on the first decision information.

For example, the second policy control network element may delay formulation of the UE policy of the UE. After obtaining the first background data transfer policy corresponding to the first decision information, the second policy control network element formulates the UE policy of the UE according to the first background data transfer policy.

Optionally, the second policy control network element sends a policy association establishment response, where the policy association establishment response does not carry the UE policy of the UE. For example, the second policy control network element sends, to the session management network element, the policy association establishment response that does not carry the UE policy.

In this way, when formulating the UE policy of the UE, the policy control network element may obtain, from the first network element, the decision information required for formulating the another policy of the UE, and formulate the UE policy based on the obtained decision information, so as to avoid a conflict between the formulated background data transfer policy corresponding to the decision information and the UE policy, and ensure availability of the background data transfer policy and the UE policy.

With reference to the 5G communication system shown in FIG. 3a, an example in the following is used to describe the method shown in FIG. 1. In the example, a policy control network element is a PCF (where for example, the first policy control network element is PCF 2, and the second policy control network element is PCF 1), an application server is an AF (where for example, the first application server is AF 2, and a second application server is AF 1), the first network element is a UDR network element, the first background data transfer policy is a background data transfer policy 1, the first decision information is decision information 1, PCF 1 updates or renegotiates the background data transfer policy 1, and PCF 2 formulates the UE policy and the UE session management policy. Although not shown in FIG. 3a, the 5G communication system shown in FIG. 3a may further include an access and mobility management function (AMF), a session management function (SMF), and another network element. This is not limited.

Figure 11A:
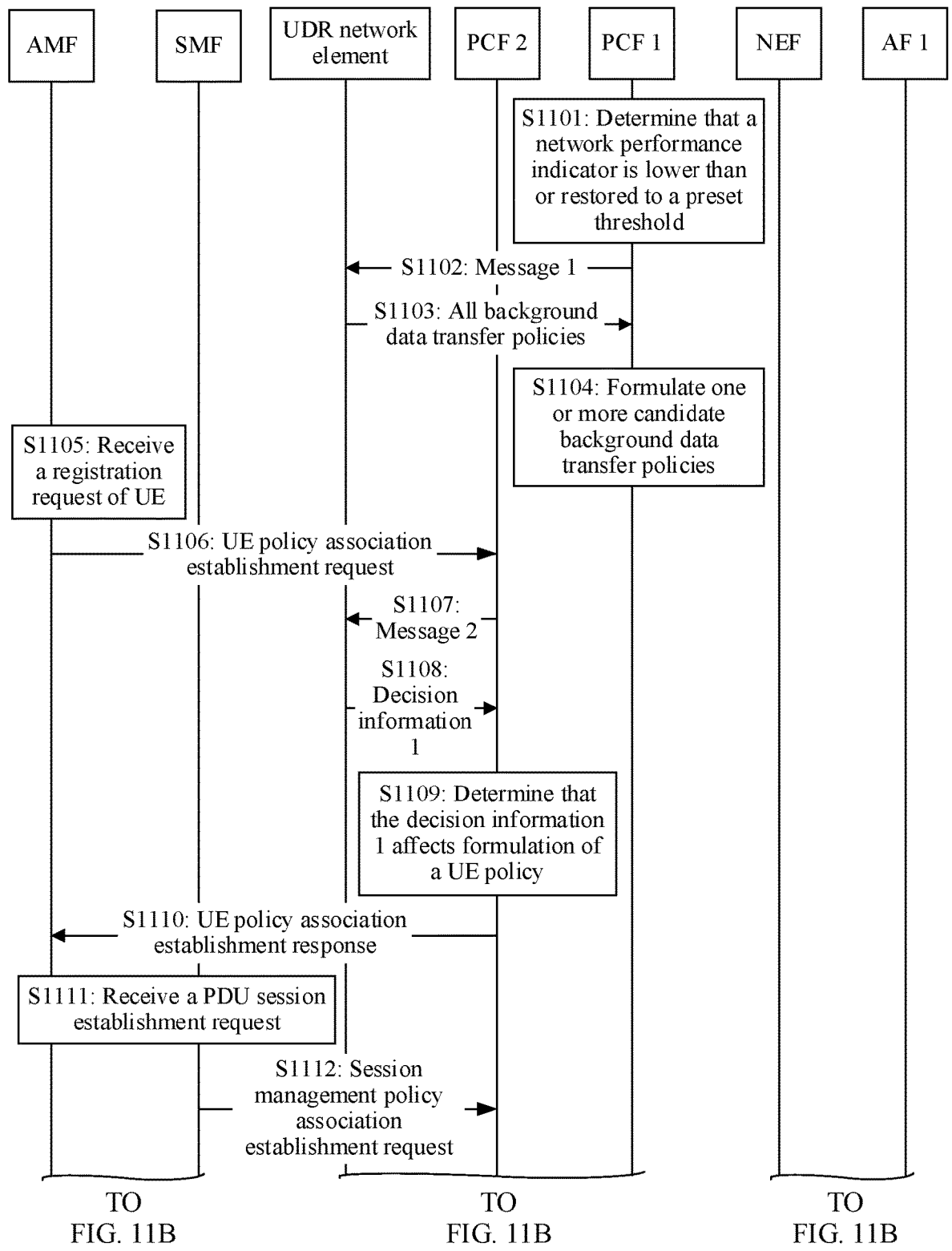
FIG. 11A and FIG. 11B are a flowchart of a session management method according to an embodiment of this application.
Figure 11B:
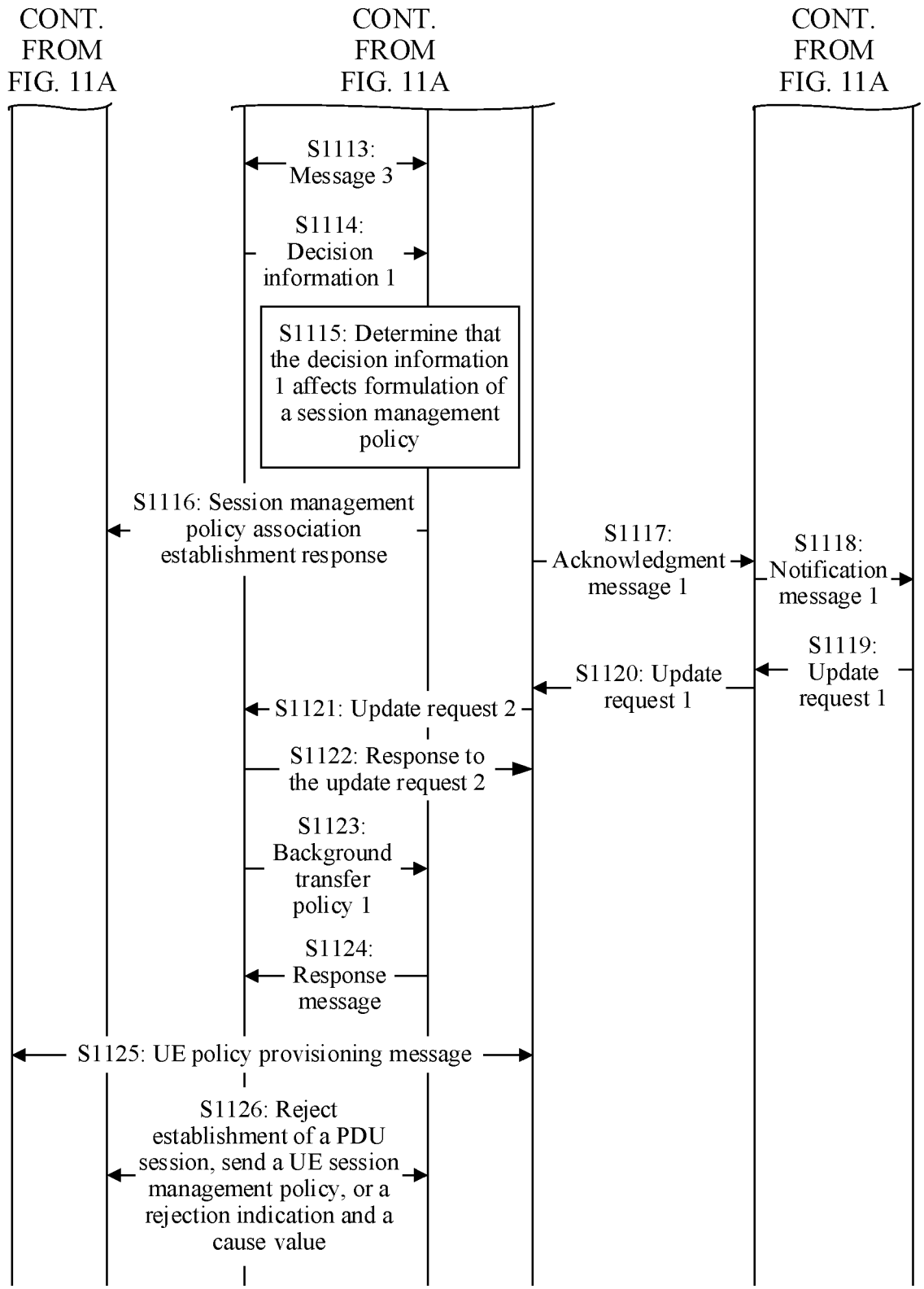

FIG. 11A and FIG. 11B are a flowchart of a method for formulating a UE policy and a session management policy according to a background data transfer policy according to an embodiment of this application. As shown in FIG. 11A and FIG. 11B, the method may include the following steps.

S101: PCF 1 determines that a network performance indicator is lower than or restored to a preset threshold.

The preset threshold may be set based on a requirement, and is not limited. For example, after a transfer window is allocated, if a network changes, network load in such a time period becomes congested, and a charge rate correspondingly becomes high. Consequently, a user transfer charge rate is high, and a requirement of a user on performing network transfer by using a lowest charge cannot be met, that is, the network performance indicator is lower than the preset threshold.

For example, PCF 1 may determine whether the network performance indicator is lower than or restored to the preset threshold. Alternatively, PCF 1 may learn, from another network element, whether the network performance indicator is lower than or restored to the preset threshold. For example, PCF 1 sends a subscription request to an NWDAF, where the subscription request is used to obtain a network performance indicator event, and the network performance indicator event is an event that a network performance indicator in a time window of a formulated background data transfer policy (for example, a background data transfer policy 3 formulated based on decision information 1) is lower than or restored to the preset threshold, and PCF 1 receives the network performance indicator event notified by the NWDAF.

Before S1101, PCF 1 formulates the background data transfer policy 3 based on the decision information 1, and stores the decision information 1 and the background data transfer policy 3 that correspond to reference Id 1 in a UDR.

S1102: PCF 1 sends a message 1 to the UDR network element.

The message 1 may be a data management_query request (Nudr_DM_query request) provided by a Nudr interface. The message 1 is used to request all background data transfer policies stored in the UDR network element. The message 1 may carry the reference identifier reference Id 1 allocated by PCF 1 to the background data transfer policy 3 and the decision information 1. This application is not limited to including reference Id 1 and the decision information 1 in the message 1 and sending the message 1 to the UDR network element. Alternatively, PCF 1 may send reference Id 1 and the decision information 1 to the UDR network element based on another message.

PCF 1 may use a special information element to carry the decision information 1 to indicate that a background data transfer policy corresponding to reference Id 1 is being formulated, include a special identifier in the decision information 1 to indicate that a background data transfer policy corresponding to reference Id 1 is being formulated, or use a reason for formulating a background data transfer policy in the decision information 1 to indicate that the background data transfer policy corresponding to reference Id 1 is being formulated. In addition, the foregoing information also indicates that the background data transfer policy 3 is not a valid background data transfer policy.

S1103: The UDR network element receives the message 1, and returns, to PCF 1, all the background data transfer policies stored in the UDR network element.

Further, the UDR network element correspondingly stores the decision information 1 and reference Id 1.

It should be noted that, in this case, if the UDR network element stores decision information required for formulating a background data transfer policy by another PCF, the UDR network element further returns the decision information stored in the UDR network element.

S1104: PCF 1 receives all the background data transfer policies stored in the UDR network element, and formulates one or more candidate background data transfer policies according to a carrier policy and all the background data transfer policies stored in the UDR network element and based on a current network status and the like.

The candidate background data transfer policy is a background data transfer policy that may be selected by AF 1 as the background data transfer policy 1. A candidate background data transfer policy may include one or more of information such as a policy identifier, a recommended transfer time window, a maximum aggregate bit rate, and a rating group identifier.

For example, for a process in which PCF 1 formulates the one or more candidate background data transfer policies according to the carrier policy and all the background data transfer policies stored in the UDR network element and based on the current network status and the like, refer to a conventional technology. Details are not described.

Further, after formulating the one or more candidate background data transfer policies, PCF 1 performs S116 to S113 shown in FIG. 1. In a process in which PCF 1 performs S116 to S113, another PCF may formulate a UE policy or a session management policy according to the background data transfer policy. Specifically, the process is shown in the following steps.

S1105: The UE initiates a registration request to an AMF, and the AMF receives the registration request of the UE.

The registration request of the UE is used to request to register with the network.

S1106. The AMF sends a UE policy association establishment request to PCF 2, and PCF 2 determines, according to a network policy or based on subscription information of the UE, obtained application data, or the like, that the background data transfer policy corresponding to reference Id 1 needs to be obtained to formulate the UE policy. A UE policy association between the AMF and PCF 2 is used by the PCF 2 to provide, for the AMF, the UE policy to be sent to the UE.

S1107: PCF 2 sends a message 2 to the UDR network element.

The message 2 may be used to request the background data transfer policy corresponding to reference Id 1, and the message 2 may include reference Id 1.

S1108: The UDR network element returns, to PCF 2, the decision information 1 corresponding to reference Id 1.

The UDR network element may use the special information element to carry the decision information 1 to indicate that the background data transfer policy corresponding to reference Id 1 is being negotiated, include the special identifier in the decision information 1 to indicate that the background data transfer policy corresponding to reference Id 1 is being negotiated, or use the reason for formulating the background data transfer policy 1 in the decision information 1 to indicate that the background data transfer policy corresponding to reference Id 1 is being negotiated.

Optionally, the UDR further returns the background data transfer policy 3 to PCF 2. The decision information 1 indicates that the background data transfer policy 3 has been invalid.

S1109: PCF 2 determines that the decision information 1 affects formulation of the UE policy.

Because the decision information 1 indicates that the background data transfer policy corresponding to reference Id 1 is being formulated, or the decision information 1 indicates that the background data transfer policy 3 has been invalid, PCF 2 decides/formulates, without depending on the decision information 1 or the background data transfer policy 3, a UE policy corresponding to the background data transfer policy 3, or delays deciding/formulating, according to the background data transfer policy 1, the UE policy corresponding to the background data transfer policy 1.

S1110: PCF 2 returns a UE policy association establishment response to the AMF.

The UE policy association establishment response does not carry a UE policy that needs to be formulated according to the background data transfer policy 1 or the background data transfer policy 3.

S1111: After registration of the UE succeeds, the UE sends a PDU session establishment request to the AMF, and the AMF further sends the PDU session establishment request to an SMF. The SMF receives the PDU session establishment request from the AMF.

S1112: The SMF sends a session management policy association establishment request to PCF 2, and PCF 2 determines, based on subscription information, according to a network policy, or the like, that the background data transfer policy corresponding to reference Id 1 needs to be obtained to formulate the session management policy. A session management policy association established between the SMF and PCF 2 is used by PCF 2 to provide, for the SMF, a policy related to PDU session management, for example, PDU session-related policy information (including a maximum aggregation bit rate of the session, a policy control request trigger, and the like) and a policy and charging rule. In this way, the PCF manages the PDU session.

S1113: PCF 2 sends a message 3 to the UDR network element to request the background data transfer policy. The message 3 includes reference Id 1.

S1114: The UDR network element returns, to PCF 2, the decision information 1 corresponding to reference Id 1.

For example, the UDR network element uses the special information element to carry the decision information 1 to indicate that the background data transfer policy corresponding to reference Id 1 is being negotiated, includes the special identifier in the decision information 1 to indicate that the background data transfer policy corresponding to reference Id 1 is being negotiated, or uses the reason for formulating the background data transfer policy in the decision information 1 to indicate that the background data transfer policy corresponding to reference Id 1 is being negotiated.

Optionally, the UDR returns the background data transfer policy 3 to PCF 2.

S1115: PCF 2 determines that the decision information 1 affects formulation of the UE session management policy.

Because the decision information 1 indicates that the background data transfer policy corresponding to reference Id 1 is being formulated, or the decision information 1 indicates that the background data transfer policy 3 has been invalid, PCF 2 decides the session management policy of the UE without depending on the decision information 1; PCF 2 determines to accept the session management policy association establishment request, and delays deciding, based on the decision information 1 or according to the background data transfer policy 3, the session management policy that is of the UE and that corresponds to the background data transfer policy; or PCF 2 determines to reject the session management policy association establishment request.

S1116: PCF 2 returns a session management policy association response message to the SMF.

If PCF 2 determines, based on the decision information 1, to delay deciding the UE session management policy corresponding to the background data transfer policy, PCF 2 returns an accept indication or a successful indication to the SMF. If PCF 2 determines to reject the session management policy association establishment request, PCF 2 includes a reject indication and a cause value in the session management policy association establishment response message. The reject indication may indicate rejection of the session management policy association establishment request, and the cause value may be that the background data transfer policy is being renegotiated or the background data transfer policy is invalid.

Further, the SMF sends the rejection indication and the cause value to the AMF, and the AMF further sends the rejection indication and the cause value to the UE. The SMF further returns a corresponding response message to the AMF.

S1117: PCF 1 formulates the one or more candidate background data transfer policies based on the decision information 1 and the current network status and according to all the existing background data transfer policies and the carrier policy, and sends an acknowledgment message 1 to an NEF.

S1118: The NEF receives the acknowledgment message 1, and returns a notification message 1 to AF 1.

S1119: AF 1 receives the notification message 1, and if AF 1 determines to select one of the one or more candidate background data transfer policies as the background data transfer policy 1, AF 1 includes reference Id 1 and a policy identifier of the selected background data transfer policy 1 in an update request 1 sent by AF 1 to the NEF; or if AF 1 rejects all candidate background data transfer policies, AF 1 includes a rejection indication in an update request 1 sent by AF 1 to the NEF.

S1120: The NEF receives the update request 1, and sends an update request 1 to PCF 1.

S1121: PCF 1 receives the update request 1, and sends an update request 2 to the UDR network element.

The update request 2 may be a Nudr_DM_Update Request.

For example, PCF 1 may send the update request 2 to the UDR based on content in the update request 1. For example, if the update request 1 carries reference Id 1 and the policy identifier of the selected background data transfer policy 1, the update request 2 carries reference Id 1 and the selected background data transfer policy 1; if the update request 1 carries the rejection indication, the update request may carry reference Id 1 and a deletion indication, where the deletion indication may indicate to delete the decision information and/or the background data transfer policy that correspond/corresponds to reference Id 1.

S1122: The UDR network element receives the update request 2, and returns a response to the update request 2 to PCF 1.

Further, when the update request 2 carries reference Id 1 and the background data transfer policy 1, the UDR network element updates the background data transfer policy corresponding to reference Id 1 to the background data transfer policy 1; or when the update request 2 carries reference Id 1 and the deletion indication, the UDR network element deletes the decision information 1 corresponding to reference Id 1 and/or the stored background data transfer policy 3.

S1123: Because PCF 2 has previously subscribed to an event notification of a background data transfer policy change from the UDR network element, the UDR network element sends the new background data transfer policy 1 or sends reference Id 1 and the deletion indication to PCF 2.

S1124: PCF 2 receives the background data transfer policy 1, or PCF 2 receives reference Id 1 and the deletion indication, and returns a response message to the UDR network element.

S1125: If PCF 2 receives the background data transfer policy 1, PCF 2 formulates the corresponding UE policy according to the background data transfer policy 1, and PCF 2 sends a UE policy provisioning message to the AMF, where the UE policy provisioning message includes the formulated UE policy. The AMF further sends the UE policy to the UE.

If PCF 2 receives reference Id 1 and the deletion indication, the PCF 2 deletes the decision information 1 and/or the background data transfer policy 3 that correspond/corresponds to reference Id 1, and terminates the session management policy association establishment request.

S1126: If PCF 2 returns the accept indication or the successful indication to the SMF in step S1116, and if PCF 2 receives the new background data transfer policy 1, PCF 2 formulates a corresponding UE session management policy according to the new background data transfer policy 1 or rejects establishment of the PDU session according to the new background data transfer policy 1.

If PCF 2 formulates the corresponding UE session management policy, PCF 2 sends the UE session management policy to the SMF.

If the PCF determines to reject the PDU session, PCF 2 sends a rejection indication and a cause value to the SMF. The cause value may be that a check condition is not met, policy authorization fails, or the like. Further, the SMF sends decision information to the AMF.

If PCF 2 returns the accept indication or the successful indication to the SMF in step S1116, and if PCF 2 receives reference Id 1 and the deletion indication, PCF 2 sends a rejection indication and a cause value to the SMF. The cause value may be that a check condition is not met, policy authorization fails, or the like.

Based on the method shown in FIG. 11A and FIG. 11B, when formulating a UE policy or a UE session management policy, a PCF may refer to a background data transfer policy formulated by another PCF or decision information required for formulating a background data transfer policy by another PCF, to avoid a conflict between the UE policy or the UE session management policy formulated by the PCF and the background data transfer policy formulated by the another PCF, and ensure availability of the UE policy or the UE session management policy formulated by the PCF.

Figure 12:
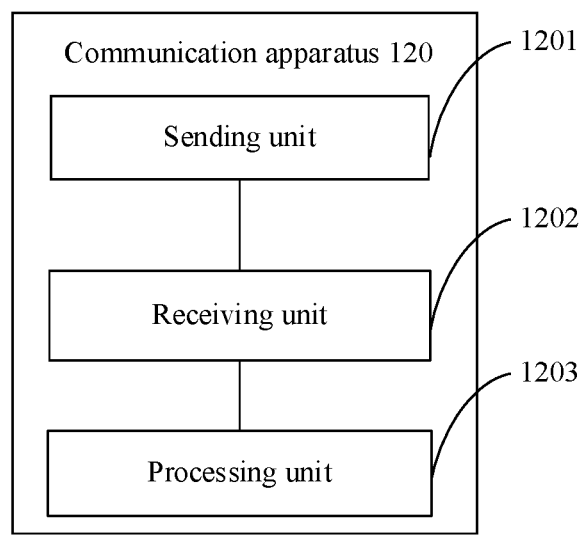
FIG. 12 is a schematic composition diagram of a communication apparatus 120 according to an embodiment of this application.

FIG. 12 is a diagram of a structure of a communication apparatus 120. The communication apparatus 120 may be a second policy control network element, a chip, a system-on-a-chip, or another apparatus that can implement a function of the second policy control network element in the foregoing methods and that is in the second policy control network element, or the like. The communication apparatus 120 may be configured to perform the function of the second policy control network element in the foregoing method embodiments. In a possible implementation, the communication apparatus 120 shown in FIG. 12 includes a sending unit 1201, a receiving unit 1202, and a processing unit 1203.

In a first implementation,
the receiving unit 1202 is configured to receive a policy association establishment request, where the policy association establishment request corresponds to a request for establishing a session of user equipment UE. For example, the receiving unit 1202 supports the communication apparatus 120 in performing S1001.

The sending unit 1201 is configured to send a fourth message to a first network element, where the fourth message may be used to request a first background data transfer policy applied to the session. For example, the sending unit 1201 is configured to support the communication apparatus 120 in performing S1002, S1107, and S1113.

The receiving unit 1202 is configured to obtain, from the first network element, first decision information stored in the first network element, where the first decision information corresponds to the first background data transfer policy. For example, the receiving unit 1202 is configured to support the communication apparatus 120 in performing S1003.

The processing unit 1203 is configured to manage a session based on the first decision information. For example, the processing unit 1203 is configured to support the communication apparatus in performing S1004, S1109, S1115, and S1126.

In this possible implementation, the processing unit 1203 is specifically configured to: when second decision information affects decision/formulation of the first background data transfer policy, accept the policy association establishment request based on the first decision information. Further, after receiving the first background data transfer policy that corresponds to the first decision information and that is sent by the first network element, the second policy control network element formulates a session management policy of the session according to the first background data transfer policy, and sends the session management policy of the session to a session management network element. Alternatively, after receiving the first background data transfer policy sent by the first network element, the second policy control network element terminates a policy association according to the first background data transfer policy. Alternatively, after receiving a deletion indication corresponding to the first decision information, the second policy control network element terminates a policy association.

Alternatively, the processing unit 1203 is specifically configured to: when second decision information affects decision/formulation of the first background data transfer policy, reject the policy association establishment request based on the first decision information.

In a second implementation,
the receiving unit 1202 is configured to receive a policy association establishment request, where the policy association establishment request corresponds to a registration request of user equipment.

The sending unit 1201 is configured to send a fourth message to a first network element, where the fourth message is used to request a first background data transfer policy applied to the UE.

The receiving unit 1202 is further configured to obtain first decision information from the first network element, where the first decision information corresponds to the first background data transfer policy.

The processing unit 1203 is configured to formulate a UE policy of the UE based on the first decision information.

In a possible design, the processing unit 1203 is specifically configured to: delay formulation of a UE policy of the UE, and after obtaining the first background data transfer policy corresponding to the first decision information, formulate the UE policy of the UE according to the first background data transfer policy.

In a possible design, the sending unit 1201 is further used by the second policy control network element to send a policy association establishment response, where the policy association establishment response does not carry the UE policy of the UE.

Specifically, all related content of the steps in the foregoing method embodiments shown in FIG. 10 and FIG. 11A and FIG. 11B may be cited in function descriptions of the corresponding functional modules. Details are not described herein again. The communication apparatus 120 is configured to perform a function of the second policy control network element in the background data transfer policy formulation methods shown in FIG. 10 and FIG. 11A and FIG. 11B, and therefore can achieve a same effect as that in the foregoing background data transfer policy formulation method.

In this embodiment, the communication apparatus 120 may further be presented in a form of functional modules obtained through division in an integrated manner. The "functional module" herein may be an application-specific integrated circuit (ASIC), a circuit, a processor and a memory that execute one or more software or firmware programs, an integrated logic circuit, and/or another component that can provide the foregoing functions. In a simple embodiment, a person skilled in the art may figure out that the communication apparatus 120 may be in a form of the communication apparatus 400 shown in FIG. 4.

For example, the processor 401 in the communication apparatus 400 shown in FIG. 4 may invoke computer-executable instructions stored in the memory 404, so that the communication apparatus 400 performs the background data transfer policy formulation methods in the foregoing method embodiments.

Specifically, functions/implementation processes of the sending unit 1201 and the receiving unit 1202 in FIG. 12 may be implemented by the processor 401 in the communication apparatus 400 shown in FIG. 4 by invoking the computer-executable instructions stored in the memory 404. The functions/implementation processes of the sending unit 1201 and the receiving unit 1202 in FIG. 12 may be implemented via the communication interface 403 in the communication apparatus 400 shown in FIG. 4. Functions/implementation processes of the processing unit 1203 in FIG. 12 may be implemented via the processor 401 in the communication apparatus 400 shown in FIG. 4.

Embodiments of this application further provide a computer-readable storage medium. All or a part of the procedures in the foregoing method embodiments may be completed by a computer program instructing related hardware. The program may be stored in the computer-readable storage medium. When the program is executed, the procedures of the foregoing method embodiments may be included. The computer-readable storage medium may be an internal storage unit of the terminal apparatus according to any one of the foregoing embodiments, for example, including a data transmitting end and/or a data receiving end. For example, the computer-readable storage medium may be a hard disk or a memory of the terminal apparatus. Alternatively, the computer-readable storage medium may be an external storage device of the terminal apparatus, for example, a plug-in hard disk, a smart media card (SMC), a secure digital (SD) card, or a flash card that is configured on the terminal apparatus. Further, the computer-readable storage medium may include both an internal storage unit and an external storage device of the terminal apparatus. The computer-readable storage medium is configured to store the computer program and other programs and data that are required by the terminal apparatus. The computer-readable storage medium may be further configured to temporarily store data that has been output or is to be output.

Embodiments of this application further provide computer instructions. All or some of the procedures in the foregoing method embodiments may be implemented by the computer instructions instructing related hardware (such as a computer, a processor, a network device, and a terminal). A program may be stored in the foregoing computer-readable storage medium.

It should be understood that in embodiments of this application, "B corresponding to A" indicates that B is associated with A. For example, B may be determined based on A. It should be further understood that determining B based on A does not mean that B is determined based only on A. B may alternatively be determined based on A and/or other information. In addition, in embodiments of this application, "connection" means various connection manners such as a direct connection or an indirect connection, for implementing communication between devices. This is not limited in embodiments of this application.

In embodiments of this application, unless otherwise specified, "transfer" (transmit/transmission) refers to bidirectional transfer, and includes a sending action and/or a receiving action. Specifically, "transfer" in embodiments of this application includes data sending, data receiving, or data sending and receiving. In other words, data transfer herein includes uplink data transfer and/or downlink data transfer. Data may include a channel and/or a signal. The uplink data transfer is uplink channel transfer and/or uplink signal transfer, and the downlink data transfer is downlink channel transfer and/or downlink signal transfer. In embodiments of this application, a "network" and a "system" express a same concept, and a communication system is a communication network.

In the descriptions of this application, "/" represents an "or" relationship between associated objects unless otherwise specified. For example, A/B may represent A or B. A term "and/or" in this application represents only an association relationship between associated objects and represents that three relationships may exist. For example, A and/or B may represent the following three cases: Only A exists, both A and B exist, and only B exists, where A and B may be singular or plural. In addition, in descriptions of this application, unless otherwise specified, "a plurality of" means two or more than two. At least one of the following items (pieces) or a similar expression thereof refers to any combination of these items, including any combination of singular items (pieces) or plural items (pieces). For example, at least one item (piece) of a, b, or c may indicate: a, b, c, a and b, a and c, b and c, or a, b, and c, where a, b, and c may be singular or plural. In addition, to clearly describe the technical solutions in embodiments of this application, terms such as first and second are used in embodiments of this application to distinguish between same items or similar items that provide basically same functions or purposes. A person skilled in the art may understand that the terms such as "first" and "second" do not limit a quantity or an execution sequence, and the terms such as "first" and "second" do not indicate a definite difference. In addition, in embodiments of this application, the word such as "example" or "for example" is used to represent giving an example, an illustration, or a description. Any embodiment or design scheme described as an "example" or "for example" in embodiments of this application should not be explained as being more preferred or having more advantages than another embodiment or design scheme. Exactly, use of the word such as "example" or "for example" is intended to present a relative concept in a specific manner for ease of understanding.

The foregoing descriptions about implementations allow a person skilled in the art to understand that, for the purpose of convenient and brief description, division of the foregoing functional modules is used as an example for illustration. In actual application, the foregoing functions can be allocated to different functional modules and implemented as required, in other words, an inner structure of an apparatus is divided into different functional modules to implement all or some of the functions described above.

In the several embodiments provided in this application, it should be understood that the disclosed apparatuses and methods may be implemented in other manners. For example, the described apparatus embodiments are merely examples. For example, the module or division into the units is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented via some interfaces. The indirect couplings or communication connections between the apparatuses or units may be implemented in electronic, mechanical, or other forms.

The units described as separate parts may or may not be physically separate. Parts displayed as units may be one or more physical units, to be specific, may be located in one place, or may be distributed at a plurality of different places. Some or all of the units may be selected based on actual requirements to achieve the objectives of the solutions of embodiments.

In addition, functional units in embodiments of this application may be integrated into one processing unit, each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions of embodiments of this application essentially, or the part contributing to a conventional technology, or all or some of the technical solutions may be implemented in a form of a software product. The software product is stored in a storage medium and includes several instructions for instructing a device to perform all or some of the steps of the methods in embodiments of this application, where for example, the device may be a single-chip microcomputer, a chip, or a processor. The foregoing storage medium includes any medium that can store program code, such as a USB flash drive, a removable hard disk, a ROM, a RAM, a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A method, comprising:
    determining, by a first policy control network element, that a network performance in a first time window is lower than a preset threshold, wherein a first background data transfer policy includes the first time window, and the first background data transfer policy corresponds to a first reference identifier;
    obtaining, by the first policy control network element from a first network element, all background data transfer policies stored in the first network element;
    renegotiating, by the first policy control network element according to all the background data transfer policies stored in the first network element and based on the network performance, a background data transfer policy corresponding to the first reference identifier; and
    sending, by the first policy control network element, a first message to the first network element, wherein the first message comprises the first reference identifier and first decision information, and the first decision information indicates that the background data transfer policy corresponding to the first reference identifier is being negotiated.

2. The method according to claim 1, further comprising:
    sending, by the first policy control network element to the first network element, the background data transfer policy that is negotiated by the first policy control network element.

3. The method according to claim 1, wherein the renegotiating the background data transfer policy corresponding to the first reference identifier comprises:
    formulating, by the first policy control network element, at least one candidate background data transfer policy according to all the background data transfer policies stored in the first network element and based on the network performance, and sending the at least one candidate background data transfer policy and the first reference identifier to a first application function network element;
    receiving, by the first policy control network element, a policy identifier of a selected background data transfer policy selected by the first application function network element; and
    sending, by the first policy control network element, a second message to the first network element, wherein the second message comprises the first reference identifier and the selected background data transfer policy.

4. The method according to claim 1, wherein the renegotiating the background data transfer policy corresponding to the first reference identifier comprises:
    formulating, by the first policy control network element, at least one candidate background data transfer policy according to all the background data transfer policies stored in the first network element and based on the network performance, and sending the at least one candidate background data transfer policy and the first reference identifier to a first application function network element;
    receiving, by the first policy control network element, a rejection indication sent by the first application function network element, wherein the rejection indication indicates that the first application function network element rejects all candidate background data transfer policies; and
    sending, by the first policy control network element, a deletion indication and the first reference identifier to the first network element based on the rejection indication, wherein the deletion indication indicates the first network element to delete at least one of the first decision information or the background data transfer policy that corresponds to the first reference identifier.

5. A first policy control network element, comprising:
    at least one processor; and
    a non-transitory computer-readable storage medium storing a program to be executed by the at least one processor to cause the first policy control network element to perform operations including:
        determining that a network performance in a first time window is lower than a preset threshold, wherein a first background data transfer policy includes the first time window, and the first background data transfer policy corresponds to a first reference identifier;

obtaining, from a first network element, all background data transfer policies stored in the first network element;

renegotiating, according to all the background data transfer policies stored in the first network element and based on the network performance, a background data transfer policy corresponding to the first reference identifier; and sending a first message to the first network element, wherein the first message comprises the first reference identifier and first decision information, and the first decision information indicates that the background data transfer policy corresponding to the first reference identifier is being negotiated.

6. The first policy control network element according to claim 5, the operations further including:

sending, to the first network element, the background data transfer policy that is negotiated by the first policy control network element.

7. The first policy control network element according to claim 5, wherein the renegotiating the background data transfer policy corresponding to the first reference identifier comprises:

formulating at least one candidate background data transfer policy according to all the background data transfer policies stored in the first network element and based on the network performance, and sending the at least one candidate background data transfer policy and the first reference identifier to a first application function network element;

receiving a policy identifier of a selected background data transfer policy selected by the first application function network element; and sending a second message to the first network element, wherein the second message comprises the first reference identifier and the selected background data transfer policy.

8. The first policy control network element according to claim 5, wherein the renegotiating the background data transfer policy corresponding to the first reference identifier comprises:

formulating at least one candidate background data transfer policy according to all the background data transfer policies stored in the first network element and based on the network performance, and sending the at least one candidate background data transfer policy and the first reference identifier to a first application function network element;

receiving a rejection indication sent by the first application function network element, wherein the rejection indication indicates that the first application function network element rejects all candidate background data transfer policies; and sending a deletion indication and the first reference identifier to the first network element based on the rejection indication, wherein the deletion indication indicates the first network element to delete at least one of the first decision information or the background data transfer policy that corresponds to the first reference identifier.

9. A system, comprising:
a first policy control network element; and
a first network element, wherein
the first policy control network element is configured to perform:

determining that a network performance in a first time window is lower than a preset threshold, wherein a first background data transfer policy includes the first time window, and the first background data transfer policy corresponds to a first reference identifier;

obtaining, from the first network element, all background data transfer policies stored in the first network element;

renegotiating, according to all the background data transfer policies stored in the first network element and the network performance, a background data transfer policy corresponding to the first reference identifier; and sending a first message to the first network element, wherein the first message comprises the first reference identifier and first decision information, and the first decision information indicates that the background data transfer policy corresponding to the first reference identifier is being negotiated, and wherein the first network element is configured to perform:
receiving the first message from the first policy control network element.

10. The system according to claim 9, wherein the first network element is further configured to perform:

receiving, from a second policy control network element, a message used to request the background data transfer policy stored in the first network element; and sending all the background data transfer policies stored in the first network element, the first reference identifier, and the first decision information to the second policy control network element.

11. The system according to claim 9, wherein the first network element is further configured to perform:

receiving a fourth message from a second policy control network element, wherein the fourth message comprises the first reference identifier, and wherein the fourth message requests a selected background data transfer policy that corresponds to the first reference identifier and that is applied to user equipment (UE); and sending the first decision information to the second policy control network element.

12. The system according to claim 9, wherein the first policy control network element is further configured to perform:

sending, to the first network element, the first reference identifier and the background data transfer policy that is renegotiated by the first policy control network element, and wherein the first network element is further configured to perform:

receiving, from the first policy control network element, the first reference identifier and the background data transfer policy that is renegotiated by the first policy control network element; and storing the background data transfer policy that is renegotiated by the first policy control network element.

13. The system according to claim 12, wherein the first network element is further configured to perform:

sending the background data transfer policy that is renegotiated by the first policy control network element to a second policy control network element.

14. A method, comprising:
determining, by a first policy control network element, that a network performance in a first time window is lower than a preset threshold, wherein a first background data transfer policy includes the first time window, and the first background data transfer policy corresponds to a first reference identifier;

obtaining, by the first policy control network element from a first network element, all background data transfer policies stored in the first network element;

renegotiating, by the first policy control network element according to all the background data transfer policies stored in the first network element and based on the network performance, a background data transfer policy corresponding to the first reference identifier;

sending, by the first policy control network element, a first message to the first network element, wherein the first message comprises the first reference identifier and first decision information, and the first decision information indicates that the background data transfer policy corresponding to the first reference identifier is being negotiated; and receiving, by the first network element, the first message from the first policy control network element.

15. The method according to claim 14, wherein the renegotiating the background data transfer policy corresponding to the first reference identifier comprises:

formulating, by the first policy control network element, at least one candidate background data transfer policy according to all the background data transfer policies stored in the first network element and based on the network performance, and sending the at least one candidate background data transfer policy and the first reference identifier to a first application function network element;

receiving, by the first policy control network element, a policy identifier of a selected background data transfer policy selected by the first application function network element; and sending, by the first policy control network element, a second message to the first network element, wherein the second message comprises the first reference identifier and the selected background data transfer policy.

16. The method according to claim 14, wherein the renegotiating the background data transfer policy corresponding to the first reference identifier comprises:

formulating, by the first policy control network element, at least one candidate background data transfer policy according to all the background data transfer policies stored in the first network element and based on the network performance, and sending the at least one candidate background data transfer policy and the first reference identifier to a first application function network element;

receiving, by the first policy control network element, a rejection indication sent by the first application function network element, wherein the rejection indication indicates that the first application function network element rejects all candidate background data transfer policies; and sending, by the first policy control network element, a deletion indication and the first reference identifier to the first network element based on the rejection indication, wherein the deletion indication indicates the first network element to delete at least one of the first decision information or the background data transfer policy that corresponds to the first reference identifier.

17. The method according to claim 14, further comprising:

receiving, by the first network element from a second policy control network element, a message requesting a selected background data transfer policy stored in the first network element; and sending, by the first network element, all the background data transfer policies stored in the first network element, the first reference identifier, and the first decision information to the second policy control network element.

18. The method according to claim 14, further comprising:

receiving, by the first network element, a fourth message from a second policy control network element, wherein the fourth message comprises the first reference identifier, and the fourth message requests a selected background data transfer policy that corresponds to the first reference identifier and that is applied to user equipment (UE); and sending, by the first network element, the first decision information to the second policy control network element.

19. The method according to claim 14, further comprising:

sending, by the first policy control network element to the first network element, the first reference identifier and the background data transfer policy that is renegotiated by the first policy control network element; and receiving, by the first network element from the first policy control network element, the first reference identifier and the background data transfer policy that is renegotiated by the first policy control network element; and storing, by the first network element, the background data transfer policy that is renegotiated by the first policy control network element.

20. The method according to claim 19, further comprising:

sending, by the first network element, the background data transfer policy that is renegotiated by the first policy control network element to a second policy control network element.

* * * * *